(12) United States Patent
Nakaya et al.

(10) Patent No.: US 6,528,657 B2
(45) Date of Patent: Mar. 4, 2003

(54) FLUORESCENT CARBAZOLE DERIVATIVE

(75) Inventors: Tadao Nakaya, Tokyo (JP); Takao Yamauchi, Yokohama (JP); Akio Tajima, Ebina (JP); Hidemasa Mouri, Yokohama (JP)

(73) Assignee: Taiho Industries Co., Ltd., Tokyo (JP)

( * ) Notice: Subject to any disclaimer, the term of this patent is extended or adjusted under 35 U.S.C. 154(b) by 0 days.

(21) Appl. No.: 09/889,591

(22) PCT Filed: Nov. 30, 2000

(86) PCT No.: PCT/JP00/08471

§ 371 (c)(1),
(2), (4) Date: Sep. 28, 2001

(87) PCT Pub. No.: WO01/40401

PCT Pub. Date: Jun. 7, 2001

(65) Prior Publication Data

US 2003/0023099 A1 Jan. 30, 2003

(30) Foreign Application Priority Data

Dec. 12, 1999 (JP) ............................................. 11-343928
Jun. 21, 2000 (JP) ........................................ 2000-186941

(51) Int. Cl.⁷ ........................ C09K 11/06; C07D 209/82
(52) U.S. Cl. .......................... 548/440; 548/444; 430/59
(58) Field of Search ................................. 548/440, 444

(56) References Cited

U.S. PATENT DOCUMENTS 5,378,519 A    1/1995   Kikuchi et al.

FOREIGN PATENT DOCUMENTS

| DE | 2513150 A1 | | 10/1975 |
| DE | 2513189 A1 | | 10/1975 |
| DE | 19951135 A1 | * | 4/2001 |
| JP | 3-163188 A | | 7/1991 |
| JP | 3-205477 A | | 9/1991 |
| JP | 6-136360 A | | 5/1994 |
| JP | 8-143862 A | | 6/1996 |

* cited by examiner

Primary Examiner—Joseph K. McKane
Assistant Examiner—Kamal Saeed
(74) Attorney, Agent, or Firm—Arent Fox Kintner Plotkin & Kahn PLLC

(57) ABSTRACT

The object of this invention is to provide an illuminant, which can easily be produced at low cost. This invention is a carbazole derivative luminescent compound having a carbazole ring skeleton, to the nitrogen atom of which is attached an electron-donating group, and to the carbon atom of which is attached an electron-attracting group at the third position to the nitrogen atom.

3 Claims, 37 Drawing Sheets

FLUORESCENT CARBAZOLE DERIVATIVE

This is a 371 of PCT/JP00/08471 filed Nov. 30, 2000.

FIELD OF THE INVENTION

This invention relates to a novel carbazole derivative luminescent compound. More particularly, this invention relates to a novel carbazole derivative luminescent compound, which is used for an EL (electroluminescence) light emission element and can emit lights of various colors when an energy such as electric energy or electromagnetic energy is applied thereto.

BACKGROUND OF THE INVENTION

The EL elements can easily emit visible lights of various colors such as blue, yellowish green or red depending upon kinds of compounds. A great number of light-emitting compounds have been researched and developed.

These compounds may include, for example, aluminum-8-hydroxyquinolinolate complex derivatives, oxadiazole derivatives, triazole derivatives, distyrylallylene derivatives, coumarin derivatives, bis(styryl)amine derivatives.

These compounds hitherto used have problems such as high cost of production for such reasons that their starting materials are peculiar, they are produced through many process steps, the process conditions are peculiar, and the yield is low. Thus, only a few of these compounds have put to practical use. The compounds put to practical use have been desired to be low in their production cost.

Among the compounds emitting a blue, yellowish green and red light, the compound emitting a clear red light has been particularly desired. That is, the maximum luminescent wavelength of red light emitted by conventional CRT displays is 625 nm. In order to obtain a clearer red light, a sharp peak of wavelength must be produced within the range of 630 to 640 nm, and has been desired.

The object of this invention is to solve the problems above. That is, the object of this invention is to provide a novel illuminant, which can be produced with ease and at low cost.

Another object of this invention is to provide a novel red illuminant having a maximum luminescent wavelength of 600 to 700 nm.

A still further object of this invention is to provide a novel carbazole derivative luminescent compound emitting a light having the desired luminescent wavelength varying depending upon the kind of substituents of the derivatives.

DESCRIPTION OF THE INVENTION

To achieve the objects above, this invention is a carbazole derivative luminescent compound having Formula 1:

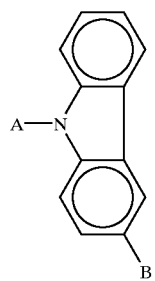

Formula 1 wherein A is an electron-donating group, and B is an electron-attracting group.

In a preferred embodiment of the carbazole derivative luminescent compound of this invention, the electron-donating group is an alkyl, haloalkyl, aminoaryl, alkylaminoaryl, or alkoxyaryl group. The alkyl group, the haloalkyl group, and the alkoxy group of the alkoxyaryl group have a carbon number of 1 to 20, respectively. The alkylaminoaryl group includes a monoalkylaminoaryl group and dialkylaminoaryl group. The alkyl group of this alkylaminoaryl group has a carbon number of 1 to 20. The above-mentioned electron-attracting group is an electron-attracting ethenyl group or aldehyde group.

In another preferred embodiment of the carbazole derivative luminescent compound of this invention, the above-mentioned electron-attracting group is the ethenyl group having Formula 2:

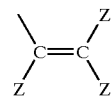

Formula 2 wherein Z is hydrogen atom, cyano group or an ester group, and at least one of the three of Z is the cyano group or ester group, or the aldehyde group.

In a further preferred embodiment of the carbazole derivative luminescent compound of this invention, the electron-attracting group is the electron-attracting ethenyl group having Formula 3:

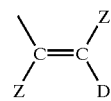

Formula 3 wherein Z is hydrogen atom or cyano group, and at least one of the two of Z is the cyano group, and D is an aryl group having at least one electron-attracting group, or the aldehyde group.

In a still further preferred embodiment of the carbazole derivative luminescent compound of this invention, the above-mentioned D is an aryl group having at least one of fluorine-containing electron-attracting groups.

BEST MODES FOR CARRYING OUT THE INVENTION

Figure 1:
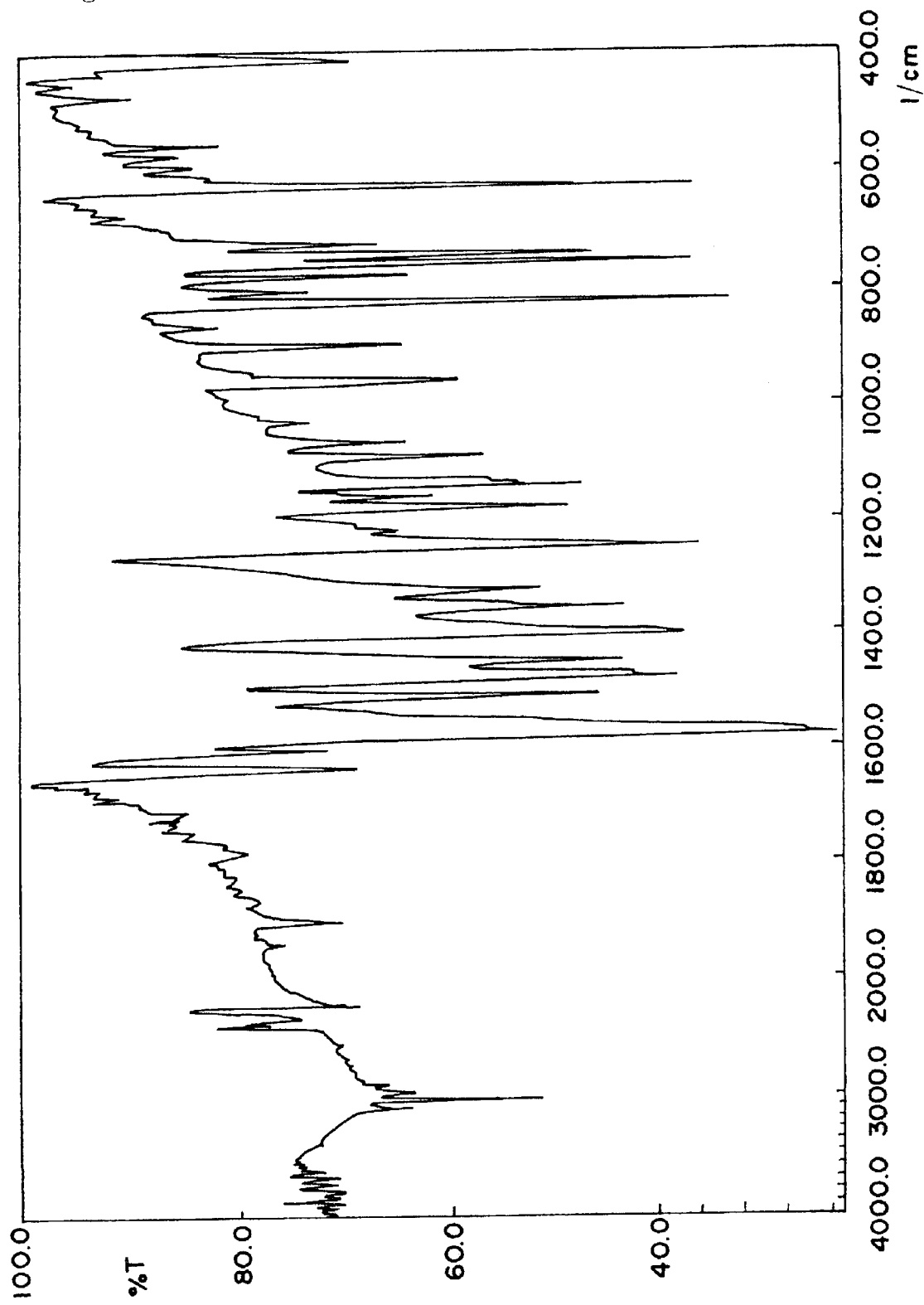
FIG. 1 is an IR chart of the yellow crystal obtained in (1) of Example 1.

The carbazole derivative luminescent compound of this invention is containing the carbzole ring skeleton having Formula 1:

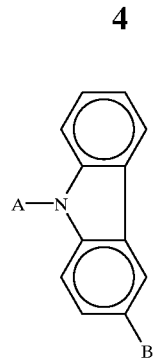

Formula 1

The carbazole derivative luminescent compound of this invention has a structure of the carbazole ring, the nitrogen atom of which has the electron-donating group A attached thereto, and the third position of which has the electron-attracting group B attached thereto.

The electron-donating group A may be a substituent acting to increase the electron density on the carbazole ring skeleton. For example, it may be an alkyl, haloalkyl, aminoaryl, alkylaminoaryl, or alkoxyaryl group.

Each of the alkyl group, haloalkyl group, and alkoxy group of the alkoxyaryl group has a carbon number of 1 to 20, preferably 1 to 10, more preferably 1 to 8. The alkylaminoaryl group may include a monoalkylaminoaryl group and dialkylaminoaryl group. The alkyl group of the alkylaminoaryl group has a carbon number of 1 to 20, preferably 1 to 10, more preferably 1 to 8.

The haloalkyl group may have the halogen atom attached thereto at any of the positions thereof, but particularly preferably at the terminal carbon of the alkyl group of the haloalkyl group.

The aryl group of the aminoaryl, alkylaminoaryl and alkoxyaryl groups may be such as phenyl, naphthyl or anthryl group. The amino, alkylamino or alkoxy group may be attached to the aryl group at any of the positions thereof. When the aryl group is phenyl group, the amino, alkylamino or alkoxy group may preferably be attached to the para position of the phenyl group.

The electron-attracting group B may be an aldehyde group or an ethenyl group having Formula 2:

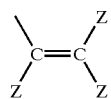

Formula 2 wherein Z is hydrogen atom, cyano group or an ester group and at least one of the tree of Z is the cyano group or ester group. The more the number of the cyano group in the electron-attracting group B, the stronger the electron-attracting force is. The above-mentioned ester group is preferably —COOR, wherein R is an alkyl group having a carbon number of 1 to 7, preferably 1 to 3, or phenyl group, most preferably methyl group or ethyl group.

The preferred electron-attracting ethenyl group has hydrogen atom or cyano group substituted at the first position thereof, and two cyano groups, or cyano group and an alkoxycarbonyl group substituted at the second position thereof.

Furthermore, the electron-attracting group B may be an electron-attracting ethenyl group having Formula 3:

Formula 3

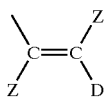

wherein Z is hydrogen atom, cyano group or an ester group, and at least one of the two of Z is the cyano group.

The above-mentioned D is an aryl group having at least one of the electron-attracting groups, preferably having at least one of fluorine atom-containing electron-attracting groups. The aryl group may be any one that has (4n+2) of pi($\pi$) electrons in accordance with Hueckel's Rule, such as single-ring phenyl groups, or plural-ring naphthyl groups or anthryl groups, or hetero-ring groups.

The electron-attracting group substituted at the aryl group may be any one that can more easily attract electrons than hydrogen atom. For example, it may be a fluoro, chloro, ammonio, trifluoromethyl, nitro, cyano, formyl, ethoxycarbonyl, carboxy, mesyl, or sulfo group. Of these groups, the fluoro group and a fluorinated hydrocarbyl group such as trifluoromethyl, pentafluoroethyl, or hexafluoropropyl group are preferred. Of these fluorinated hydrocarbyl groups, the groups having a carbon number of 1 to 5 are particularly preferred. In the case where two or more electron-attracting groups are attached to the aryl group, each of these electron-attracting groups may be identical with or different from each other.

D may have a structure, such as Formula 4, Formula 5 and Formula 6:

Formula 4

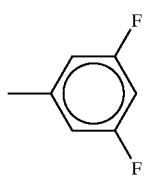

Formula 5

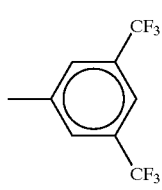

Formula 6

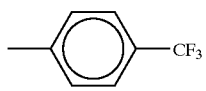

Introducing the aryl group having the electron-attracting group attached thereto into the electron-attracting ethenyl group stabilizes the structure of the carbazole derivative luminescent compound, and simultaneously increases its stability against light and heat, hardly deteriorates it, and improves its resistance to chemicals.

The carbazole derivative luminescent compound of this invention emits light when exposed to electric or electromagnetic energy. The electron density on the carbazole ring varies depending upon the correlation between the electron-donating force of the electron-donating group A and the electron-attracting force of the electron-attracting group B, and the color of the emitted light varies depending upon the electron density.

Changing the kind of the electron-donating group A to raise the electron-donating force thereof and simultaneously changing the kind of the electron-attracting group B to raise the electron-attracting force thereof, allows the light emitted from the carbazole derivative luminescent compound of this invention having these groups to turn red to deeply red. To the contrary, changing the kind of the electron-donating group A to gradually reduce the electron-donating force thereof and simultaneously changing the kind of the electron-attracting group B to gradually reduce the electron-attracting force thereof, allows the light emitted from this carbazole derivative luminescent compound having these groups to turn red, orange, yellow and green in this order. In other words, the carbazole derivative luminescent compound of this invention can emit lights of different colors from red to blue varying depending upon the chosen kinds of the electron-donating group A and the electron-attracting group B.

Typical examples of the carbazole derivative luminescent compound of this invention may be N-ethyl-3-(tricyanoethenyl)carbazole (red light-emitting substance), N-(2-chloroethyl)-3-(2,2-dicyanoethenyl)carbazole (yellowish green light-emitting substance), N-(2-chloroethyl)-3-(tricyanoethenyl)carbazole (red light-emitting substance), N-(4-methoxyphenyl)-3-(2,2-dicyanoethenyl)carbazole (yellowish green light-emitting substance), N-(4-methoxyphenyl)-3-(tricyanoethenyl) carbazole (red light-emitting substance), N-ethyl-3-(2-cyano-2-ethoxycarbonylethenyl)carbazole (orange light-emitting substance), N-ethyl-3-(1,2-dicyano-2-ethoxycarbonylethenyl)carbazole (red light-emitting substance), N-(4-dimethylaminophenyl)-cabazole-3-carboxaaldehyde (yellow light-emitting substance), N-(4-dimethylaminophenyl)-3-(dicyanoethenyl)carbazole (red light-emitting substance), N-(4'-n-octyloxybiphenyl)-3-tricyanoethenylcarbazole (red light-emitting substance), N-ehtyl-3-(1,2-dicyano-2-(4-trifluoromethylphenyl) ethenyl) carbazole (yellow light-emitting substance), N-ethyl-3-(1,2-dicyano-2-(3,5-bis(trifluoromethyl)phenyl) ethenyl)carbazole (vermilion light-emitting substance), N-(4-methoxyphenyl)-3-(1,2-dicyano-2-(3,5-bis (trifluoromethyl)phenyl)ethenyl)carbazole (orange light-emitting substance), N-(4-methoxyphenyl)-3-(1,2-dicyano-2-(3,5-difluorophenyl)ethenyl)carbazole (vermilion light-emitting substance), etc. The carbazole skeleton-containing of this invention should not be limited to the above-mentioned substances.

The reason for the carbazole derivative luminescent compound of this invention emitting various color lights as well as red light when provided with an external energy such as electric energy or electromagnetic energy, is guessed as follows: the carbazole is inherently fluorescent, $\pi$-electron is transferred from the highest occupied orbit to the lowest empty orbit of the carbazole skeleton when excited with an energy such as electromagnetic wave, and the light is emitted when the $\pi$-electron returns from the latter orbit to the former orbit. Furthermore, the electron-donating group and the electron-attracting group are interacted with each other through the $\pi$-electron orbits of the carbazole ring skeleton. This is so called a mutual $\pi$-electron conjugation or electron charge transfer within a molecule, which provides the $\pi$-electron system with a greater resonance stability, so that the energy gap between $\pi$–$\pi$* electron levels may become smaller to easily bring about electron transition.

The energy sources for allowing the carbazole derivative luminescent compound to emit lights are such as electric energy, for example, supplied by applying a voltage, or electromagnetic wave.

The carbazole as a source material for the carbazole derivative luminescent compound of this invention is excellent in an efficiency of light emission, and inexpensive. The carbazole of high purity is commercially available.

Therefore, this invention provides an illuminant with a high efficiency of light emission and high purity, at low cost.

The carbazole derivative luminescent compound of this invention is usable as a material for an EL element, luminescent lamp, fluorescent paint, X-ray fluorescent plate, X-ray sensitized paper, Braun tube, scintillator, or infrared ray detector.

The carbazole derivative luminescent compound of this invention can be produced by the normal organic synthesis reaction by which the electron-donating group is bonded to the nitrogen atom of the carbazole skeleton, and the normal organic synthesis reaction by which the electron-attracting group is bonded to the carbazole skeleton at the third position to the nitrogen atom thereof. For example, as the synthesis reaction process, reference may be made to an organic synthesis process for attaching an alkyl, alkoxyaryl, aminoaryl, alkylaminoaryl and halogenated alkyl group to the nitrogen atom of the carbazole by reacting the carbazole with a halogenated alkyl, alkoxyaryl halide, aminoaryl halide, alkylaminoaryl halide and dihalogenated alkyl, respectively; a process for attaching an ethenyl group to the carbazole at the third position to the nitrogen atom thereof; a process for attaching an aldehyde group to the carbazole at the third position to the nitrogen atom thereof, for example, by reacting the carbazole with phosphorus oxychloride and then converting the formaldehyde group to the ethenyl group; or a process for attaching a cyano group or ester group to the ethenyl group.

The carbazole to which is attached electron attracting ethenyl group B with the aryl group to which is attached the electron-attracting group, can easily be produced by reacting a carbazole having the aldehyde group at the third position to the nitrogen atom of the carbazole with an arylacetonitrile having the electron-attracting group, such as 2,3-difluorophenylacetonitrile.

Examples of the arylacetonitrile having the electron-attracting group may be a phenylacetonitrile with fluoro group and trifluoromethyl group, such as 2-fluoro-4-(trifluoromethyl)phenylacetonitrile, 2-fluoro-5-(trifluoromethyl)phenylacetonitrile, 2-fluoro-6-(trifluoromethyl)phenylacetonitrile, 3-fluoro-4-(trifluoromethyl)phenylacetonitrile, 3-fluoro-5-(trifluoromethyl)phenylacetonitrile, 4-fluoro-2-(trifluoromethyl)phenylacetonitrile, 4-fluoro-3-(trifluoromethyl)phenylacetonitrile, and 5-fluoro-2-(trifluoromethyl)phenylacetonitrile; a phenylacetonitrile with two fluoro groups, such as 2,3-difluorophenylacetonitrile, 2,4-difluorophenylacetonitrile, 2,5-difluorophenylacetonitrile, 2,6-difluorophenylacetonitrile, 3,4-difluorophenylacetonitrile, and 3,5-difluorophenylacetonitrile; a phenylacetonitrile with three fluoro groups, such as 2,3,4-trifluorophenylacetonitrile, 2,3,5-trifluorophenylacetonitrile, 2,3,6-trifluorophenylacetonitrile, 2,4,5-trifluorophenylacetonitrile, 2,4,6-trifluorophenylacetonitrile, and 3,4,5-trifluorophenylacetonitrile; a phenylacetonitrile with fluoro group, chloro group and trifluoromethyl group, such as 3-chloro-2-fluoro-5-(trifluoromethyl)phenylacetonitrile; a phenylacetonitrile with two fluoro groups and one trifluoromethyl group, such as 3-trifluoromethyl-2,6-difluorophenylacetonitrile; a phenylacetonitrile with two cyano groups and one methoxy group, such as 2,3-dicyano-4-methoxyphenylacetonitrile; a phenylacetonitrile with two fluoro groups and one methoxy group, such as 2,3-difluoro-4-methoxyphenylacetonitrile; and a phenylacetonitrile with two fluoro groups and one difluromethoxy group, such as 3,5-difluoro-4-(difluoromethoxy)phenylacetonitrile. Additional examples of the arylacetonitrile having the electron-attracting group may be 4-(trifluoromethyl)phenylacetonitrile, 3,5-bis(trifluoromethyl)phenylacetonitrile, and 2,3-difluoro-4-(trifluoromethyl)phenylacetonitrile.

EXAMPLE 1

Synthesis of N-ethyl-3-(tricyanoethenyl)carbazole (1) Synthesis of N-ethyl-3-(2,2-dicyanoethenyl)carbazole 25 g (112 mmol) of N-ethylcarbazole-3-carboxaaldehyde and 7.35 g (112 mmol) of malononitrile were placed in a 500 ml four-necked flask with a mechanical stirrer and bulb-shaped cooler. To this was added 180 ml of ethanol as solvent. Further, 9.51 g (112 mmol) of piperidine was added. The resultant product was heated to 60° C. in a silicone oil bath, and subjected to the reaction for 20 hours. After the reaction was completed, the flask was cooled down to the ambient temperature. The reaction product was subjected to suction filtration with a glass filter. The resultant solid was washed with a small amount of ethanol to obtain a yellow solid, which was recrystallized in the presence of ethanol and acetone, and then dried under vacuum to obtain 21 g of a yellow crystal.

The IR chart of this yellow crystal is shown in FIG. 1.

The yield of thus synthesized N-ethyl-3-(2,2-dicyanoethenyl)carbazole was 69%, and its melting point was 160–162° C.

(2) Synthesis of N-ethyl-3-(tricyanoethenyl)carbazole 10.2 g (37.5 mmol) of N-ethyl-3-(2,2-dicyanoethenyl)carbazole and 100 ml of N,N-dimethylformamide as solvent were placed in a 500 ml four-necked flask with a mechanical stirrer and bulb-shaped cooler. To this was added an aqueous solution of 1.84 g (37.5 mmol) of sodium cyanide and 4.3 ml of water, which was stirred for 10 minutes. Further, 16.6 g of lead tetraacetate was added. The resultant product was subjected to the reaction for 30 minutes. After the reaction was completed, 200 ml of chloroform was added. To the resultant aqueous solution was added 100 ml of water. The resultant liquid was washed in a separatory funnel. To the washed liquid was added sodium sulfate, which was left to stand for 30 minutes and dehydrated. The dehydrated solution was concentrated in an evaporator and dried under vacuum to obtain a red solid, which was recrystallized in the presence of benzene to obtain 1.5 g of a red crystal.

Figure 2:
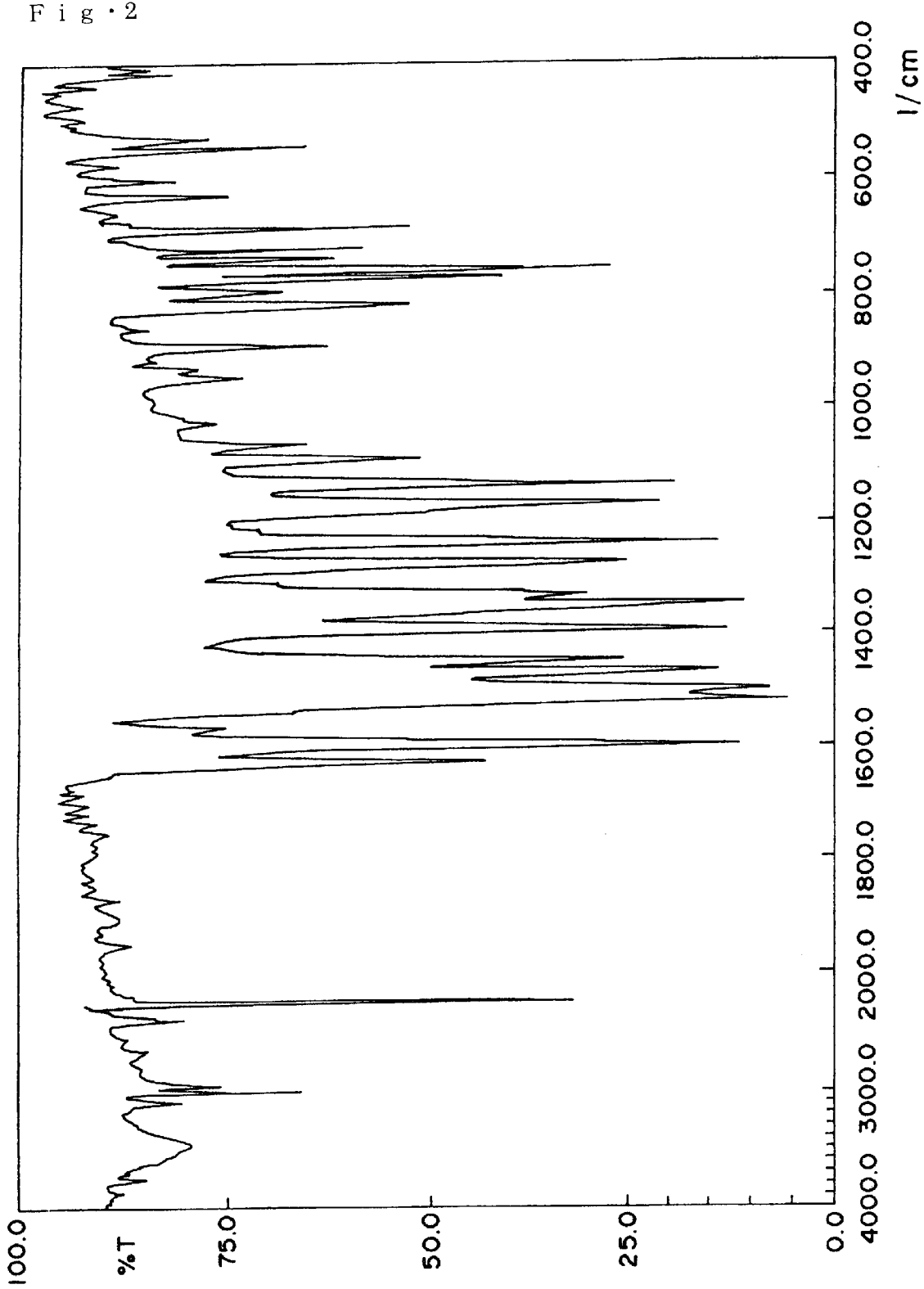
FIG. 2 is an IR chart of the red crystal obtained in (2) of Example 1.

The IR chart of the red crystal is shown in FIG. 2.

The chemical analysis of this red crystal was:
Actual measured vales: 77.35%C, 3.82%H, 18.72%N
Calculated value: 77.01%C, 4.08%H, 18.91%N The yield of the thus synthesized N-ethyl-3-(tricyanoethynyl)carbazole was 13%, and its melting point was 232–235° C. The N-ethyl-3-(tricyanoethynyl)carbazole emitted a red light of 620 nm the maximum wavelength when irradiated at a measuring temperature of 23° C. with a He-Cd laser light (325 nm beam) of 1 mW in intensity.

EXAMPLE 2

Synthesis of N-(2-chloroethyl)-3-(tricyanoethenyl)carbazole (1) Synthesis of N-(2-chloroethyl)carbazole 17.9 g (107 mmol) of carbazole and 500 ml of acetone as solvent were placed in a 1000 ml four-necked flask with a mechanical stirrer and bulb-shaped cooler. To this was added an aqueous solution prepared from 22.0 g (93.7 mmol) of 2-chloroethyl-p-toluene sulfonate, 12.5 g of sodium hydroxide and 9.2 ml of water. The resultant product was heated to 60° C. in a silicone oil bath, and subjected to the reaction for 20 hours. After the reaction was completed, the product was cooled to the ambient temperature. The precipitated solid was subjected to suction filtration with a glass filter. The resultant liquid was concentrated in an evaporator and dried under vacuum to obtain a brown solid, which was recrystallized in the presence of ligroin to obtain 9.3 g of a white crystal.

Figure 3:
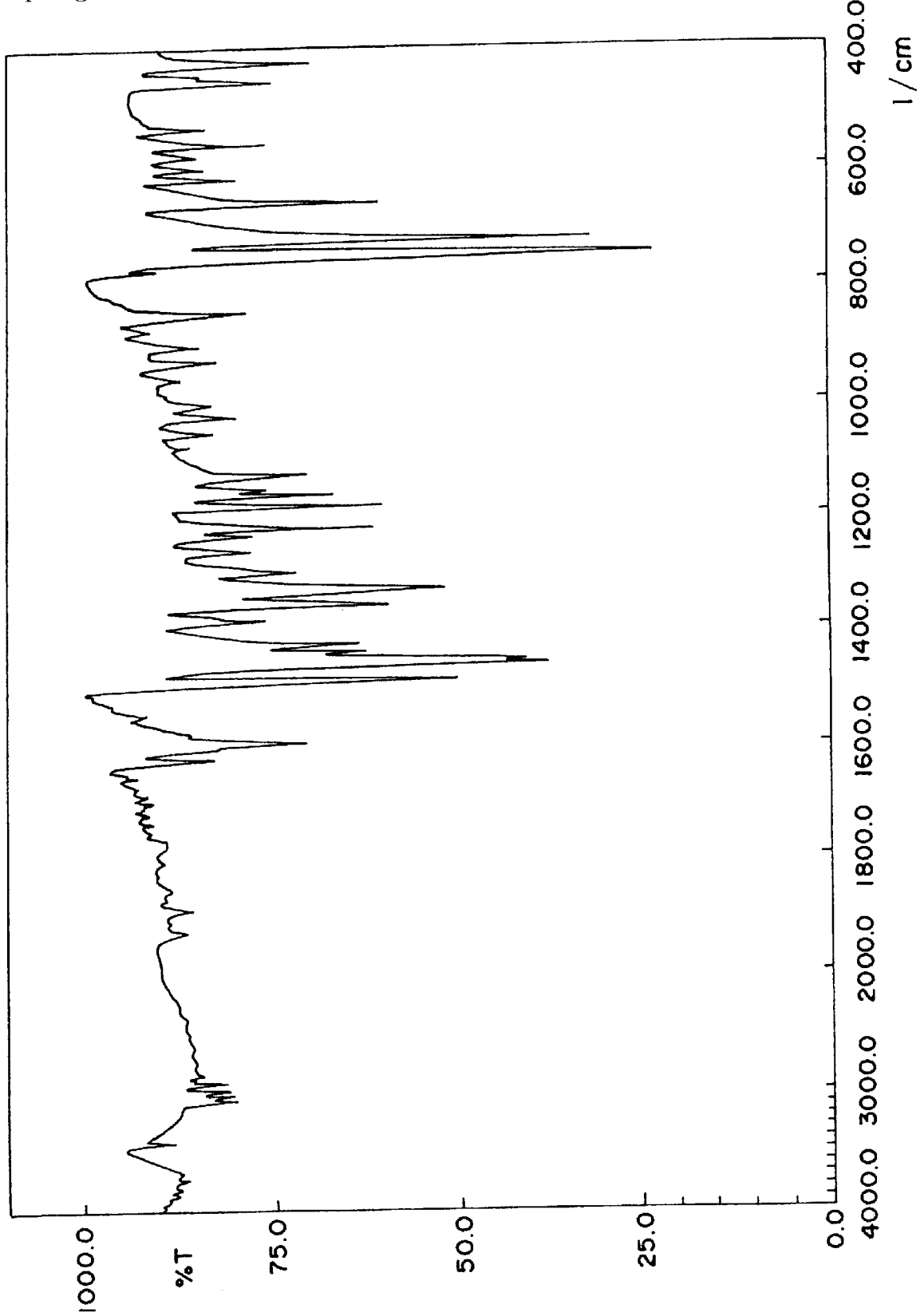
FIG. 3 is an IR chart of the white crystal obtained in (1) of Example 2.

The IR chart of the white crystal is shown in FIG. 3.

The yield of the thus synthesized N-(2-chloroethyl) carbazole was 40%, and its melting point was 120–121° C.

(2) Synthesis of N-(2-chloroethyl)-carbazole-3-carboxaaldehyde 14.6 g (204 mmol) of N,N-dimethylformamide was placed in a 300 ml four-necked flask with a mechanical stirrer and bulb-shaped cooler, which was cooled with ice water. To this was added 30.6 g (204 mmol) of phosphorus oxychloride, which was stirred for 30 minutes while being cooled with ice. After returning to the ambient temperature, 9.00 g (40.8 mmol) of N-(2-chloroethyl)carbazole was added. The resultant product was heated to 80° C. in a silicone bath, and subjected to the reaction for 1.5 hour. After the reaction was completed, the product was cooled to the ambient temperature, and then cooled with ice. The liquid in the flask was placed in ice, and treated with sodium hydroxide to have a pH of 9 to 10. The liquid was subjected to extraction with chloroform. The resultant chloroform solution was washed with water three times. To the washed solution was added sodium sulfate, which was left to stand and dehydrated. The dehydrated solution was concentrated in an evaporator and dried under vacuum to obtain a brown solid. The brown solid was recrystallized in the presence of acetone and methanol to obtain 2.3 g of a white crystal.

Figure 4:
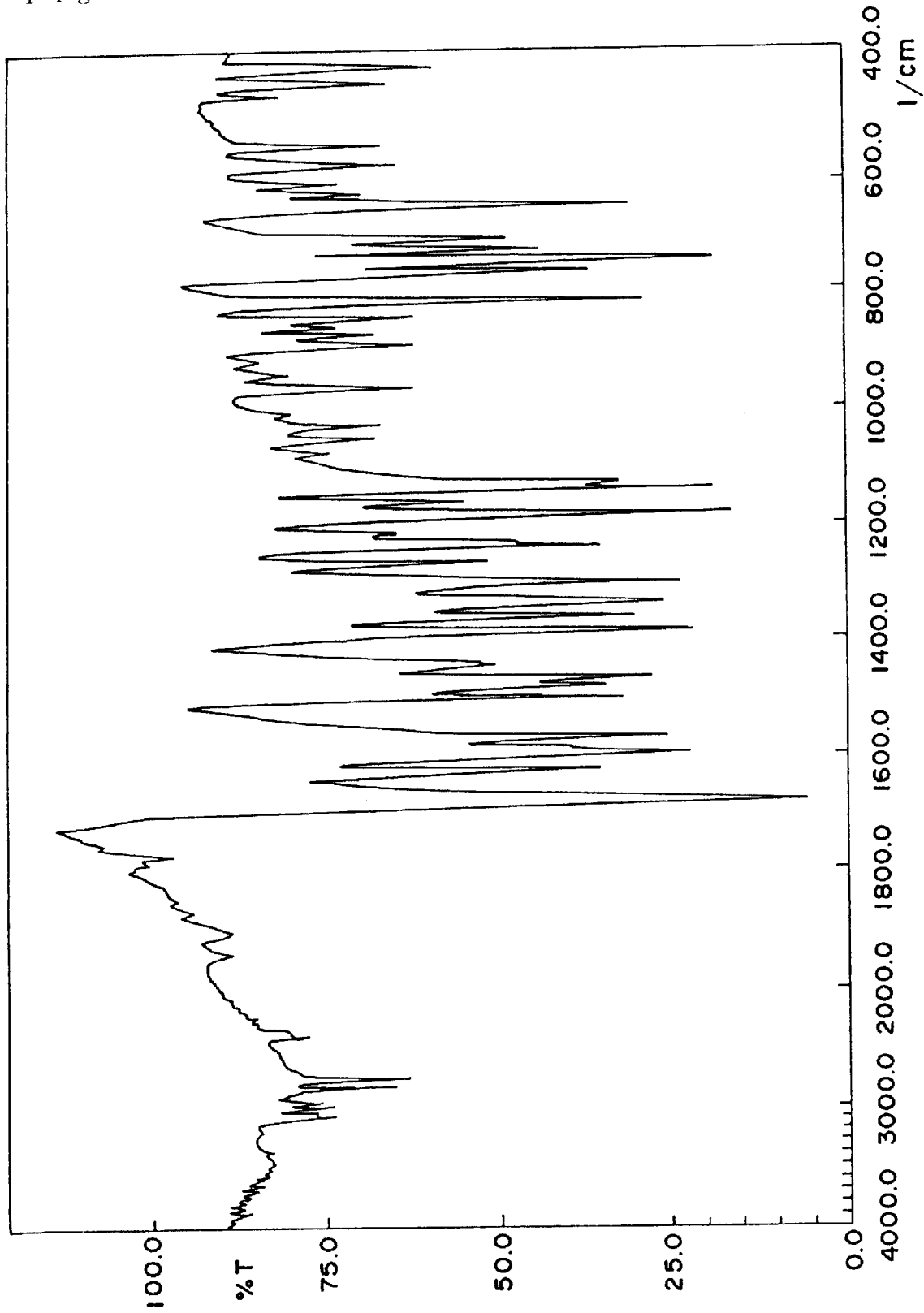
FIG. 4 is an IR chart of the white crystal obtained in (2) of Example 2.

The IR chart of the white crystal is shown in FIG. 4.

The yield of the thus synthesized N-(2-chloroethyl)-carbazole-3-carboxaaldehyde was 44%, and its melting point was 159–162° C.

(3) Synthesis of N-(2-chloroethyl)-3-(2,2-dicyanoethenyl)carbazole 2.10 g (8.29 mmol) of N-(2-chloroethyl)-carbazole-3-carboxaaldehyde and 0.55 g (8.29 mmol) of malononitrile were placed in a 200 ml four-necked flask with a mechanical stirrer and bulb-shaped cooler. To this was added 15 ml of ethanol as solvent. Further, 0.71 g (8.29 mmol) of piperidine was added. The resultant product was heated to 60° C. in a silicone oil bath, and subjected to the reaction for 3.0 hours. After the reaction was completed, the product was cooled down to the ambient temperature. The reaction product was subjected to suction filtration with a glass filter. The resultant solid was washed with a small amount of ethanol to obtain a yellow solid, which was recrystallized in the presence of ethanol and acetone, and then dried under vacuum to obtain 1.26 g of a yellow crystal.

Figure 5:
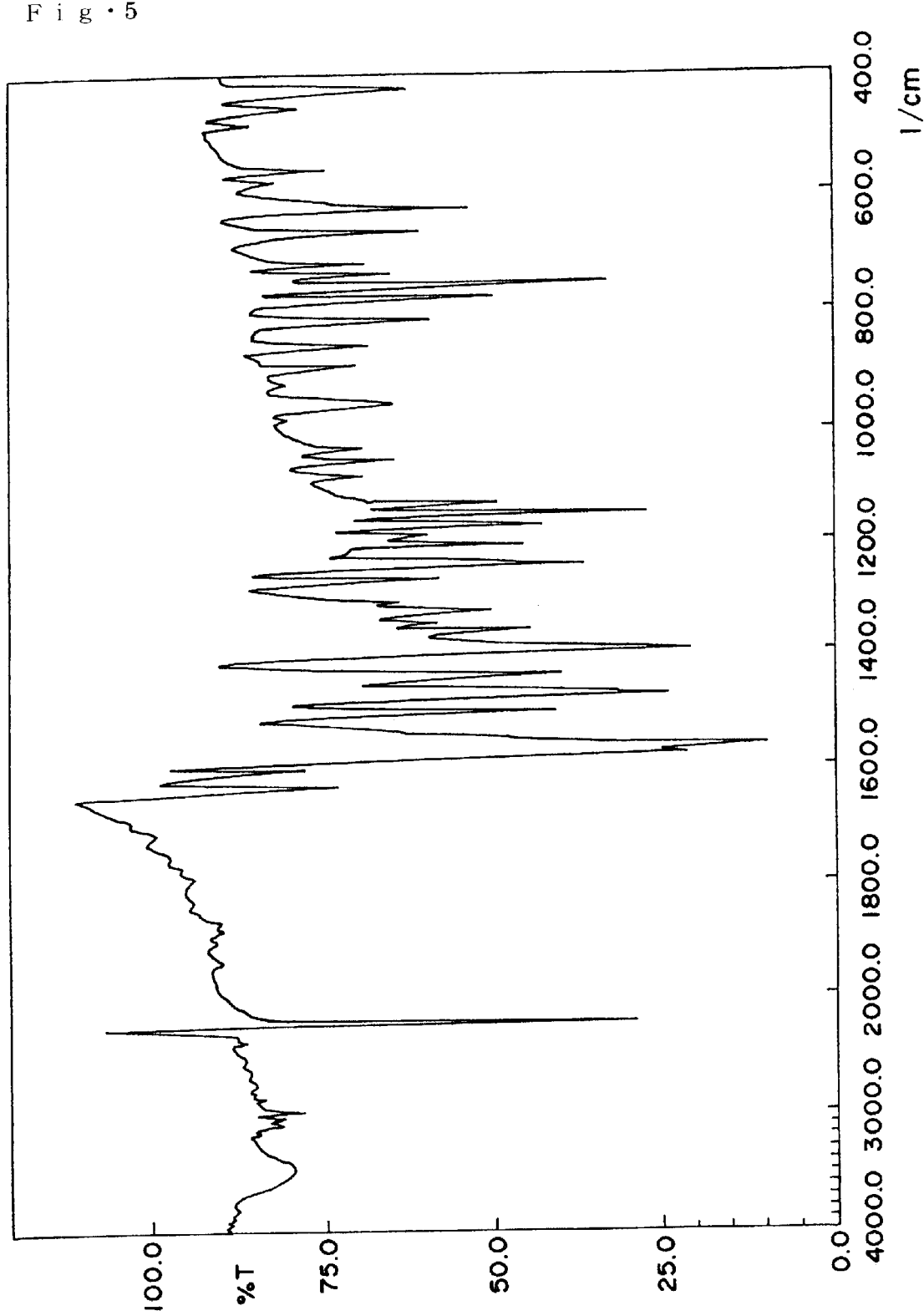
FIG. 5 is an IR chart of yellow crystal obtained in (3) of Example 2.

The IR chart of the yellow crystal is shown in FIG. 5.

The yield of the thus synthesized N-(2-chloroethyl)-3-(2,2-dicyanoethenyl)carbazole was 50%, and its melting point was 211–213 ° C.

(4) Synthesis of N-(2-chloroethyl)-3-(tricynoethenyl)carbazole 1.20 g (3.93 mmol) of N-(2-chloroethyl)-3-(2,2-dicyanoethenyl)carbazole and 10 ml of N,N-dimethylformamide as solvent were placed in a 500 ml four-necked flask with a mechanical stirrer and bulb-shaped cooler. To this was added an aqueous solution prepared from 0.19 g (3.93 mmol) of sodium cyanide and 0.4 ml of water, which was stirred for 10 minutes. Further, 1.74 g (3.93 mmol) of lead tetraacetate was added. The resultant product was subjected to the reaction for 30 minutes. After the reaction was completed, 100 ml of chloroform was added. To the resultant aqueous solution was added 100 ml of water. The resultant liquid was washed in a separatory funnel. To the washed liquid was added sodium sulfate, which was left to stand for 30 minutes and dehydrated. The dehydrated solution was concentrated in an evaporator and dried under vacuum to obtain a red solid, which was recrystallized in the presence of benzene to obtain 0.48 g of a red crystal.

Figure 6:
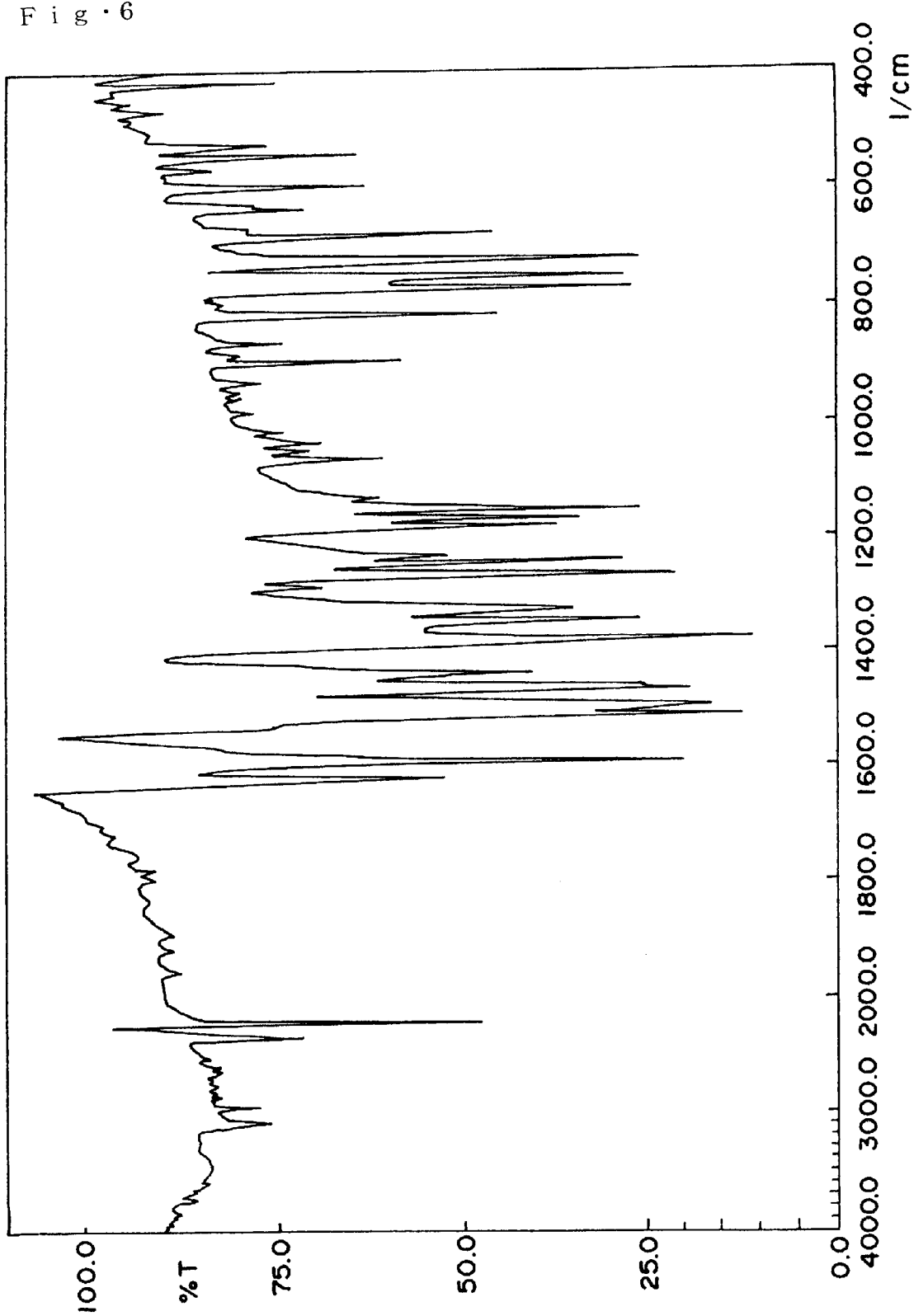
FIG. 6 is an IR chart of the red crystal obtained in (4) of Example 2.

The IR chart of the red crystal is shown in FIG. 6.

The chemical analysis of this red crystal was:

Actual measured vales: 69.16%C, 3.17%H, 16.88%N

Calculated value: 68.98%C, 3.35%H, 16.93%N

The yield of the thus synthesized N-(2-chloroethyl)-3-(tricyanoethenyl)carbazole was 37%, and its melting point was 160–162° C. The N-(2-chloroethyl)-3-(tricyanoethenyl)carbazole emitted a red light of 625 nm in the maximum wavelength when irradiated at a measuring temperature of 23° C. with a He-Cd laser light (325 nm beam) of 1 mW in intensity.

EXAMPLE 3

Synthesis of N-(4-methoxyphenyl)-3-(tricyanoethenyl)carbazole (1) Synthesis of N-(4-methoxyphenyl)carbazole 8.10 g (48.5 mmol) of carbazole, 12.50 g (53.4 mmol) of 4-iodoanisole, 0.38 g (6.08 mmol) of copper powder, 4.28 g (16.2 mmol) of 18-crown-6-ether and 7.24 g (53.4 mmol) of potassium carbonate were placed in a 500 ml four-necked flask with a mechanical stirrer and bulb-shaped cooler. To this was added 100 ml of o-dichlorobenzene as solvent. The resultant product was heated to 180° C. under a nitrogen flow in a silicone oil bath, and subjected to the reaction for 24 hours. After the reaction was completed, the reaction product was subjected to suction filtration with a suction funnel, before it was cooled down. The resultant filtrate was concentrated in an evaporator. To the resultant oily product was added 200 ml of ethanol. The precipitated solid was subjected to the filtration at a reduced pressure with a suction funnel to obtain a gray solid, which was recrystallized in the presence of benzene to obtain 6.0 g of a white crystal.

Figure 7:
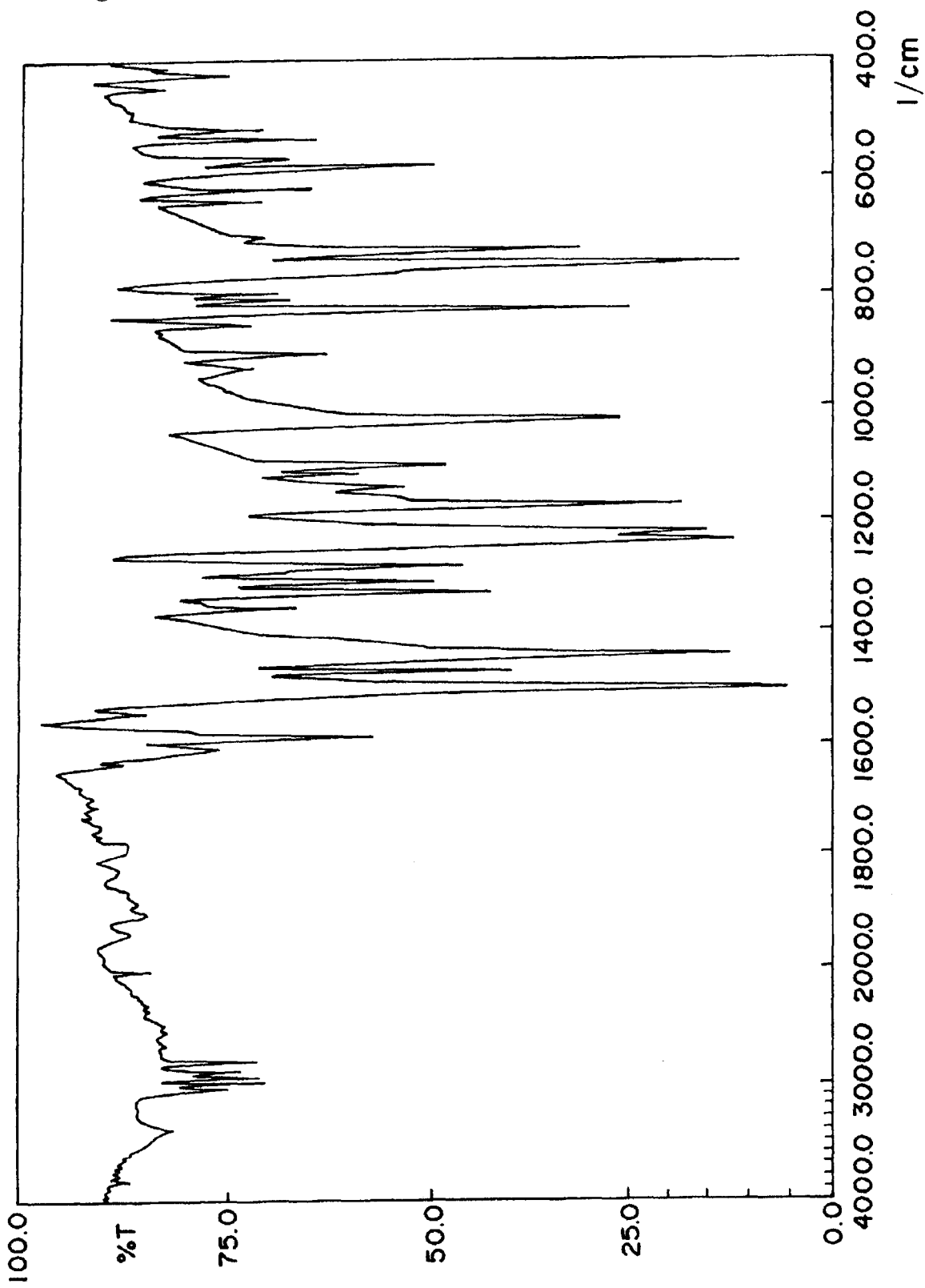
FIG. 7 is an IR chart of the white crystal obtained in (1) of Example 3.

The IR chart of this white crystal is shown in FIG. 7.

The yield of the thus synthesized N-(4-methoxyphenyl)carbazole was 45%, and its melting point was 147–149° C.

(2) Synthesis of N-(4-methoxyphenyl)-carbazole-3-carboxaaldehyde 16.1 g (220 mmol) of N,N-dimethylformamide was placed in a 300 ml four-necked flask with a mechanical stirrer and bulb-shaped cooler, which was cooled with ice water. To this was added 33.7 g (220 mmol) of phosphorus oxychloride, which was stirred for 30 minutes while being cooled with ice. After returning to the ambient temperature, 6.00 g (22.0 mmol) of N-(4-methoxyphenyl)carbazole was added. The resultant product was heated to 80° C. in a silicone bath, and subjected to the reaction for 1.0 hour. After the reaction was completed, the product was cooled to the ambient temperature, and then cooled with ice. The liquid in the flask was placed in ice, and treated with sodium hydroxide to have a pH of 9 to 10. The liquid was subjected to extraction with chloroform. The resultant chloroform solution was washed with water three times. To the washed solution was added sodium sulfate, which was left to stand and dehydrated. The dehydrated solution was concentrated in an evaporator and dried under vacuum to obtain a brown solid. The brown solid was recrystallized in the presence of acetone and methanol to obtain 4.3 g of a light yellow crystal.

Figure 8:
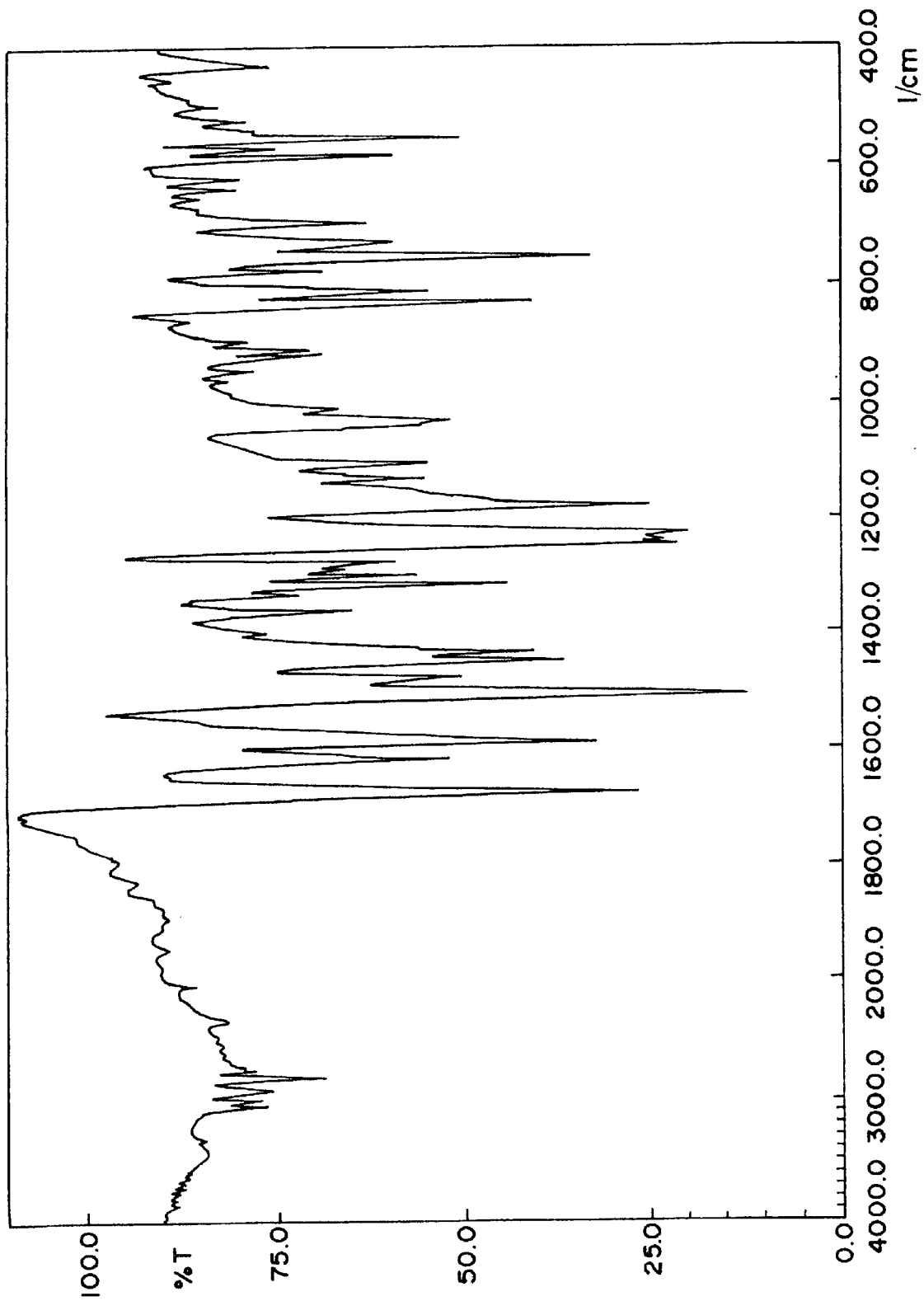
FIG. 8 is an IR chart of the red crystal obtained in (2) of Example 3.

The IR chart of the light yellow crystal is shown in FIG. 8.

The yield of the thus synthesized N-(4-methoxyphenyl)-carbazole-3-carboxaaldehyde was 65%, and its melting point was 138–140° C.

(3) Synthesis of N-(4-methoxyphenyl)-3-(2,2-dicyanoethenyl)carbazole 2.11 g (7.01 mmol) of N-(4-methoxyphenyl)-carbazole-3-carboxaaldehyde and 0.46 g (7.01 mmol) of malononitrile were placed in a 200 ml four-necked flask with a mechanical stirrer and bulb-shaped cooler. To this was added 16 ml of ethanol as solvent. Further, 0.60 g (7.01 mmol) of piperidine was added. The resultant product was heated to 60° C. in a silicone oil bath, and subjected to the reaction for 1.0 hour. After the reaction was completed, the product was cooled down to the ambient temperature. The reaction product was subjected to suction filtration with a glass filter. The resultant solid was washed with a small amount of ethanol to obtain 2.10 g of a yellow solid.

Figure 9:
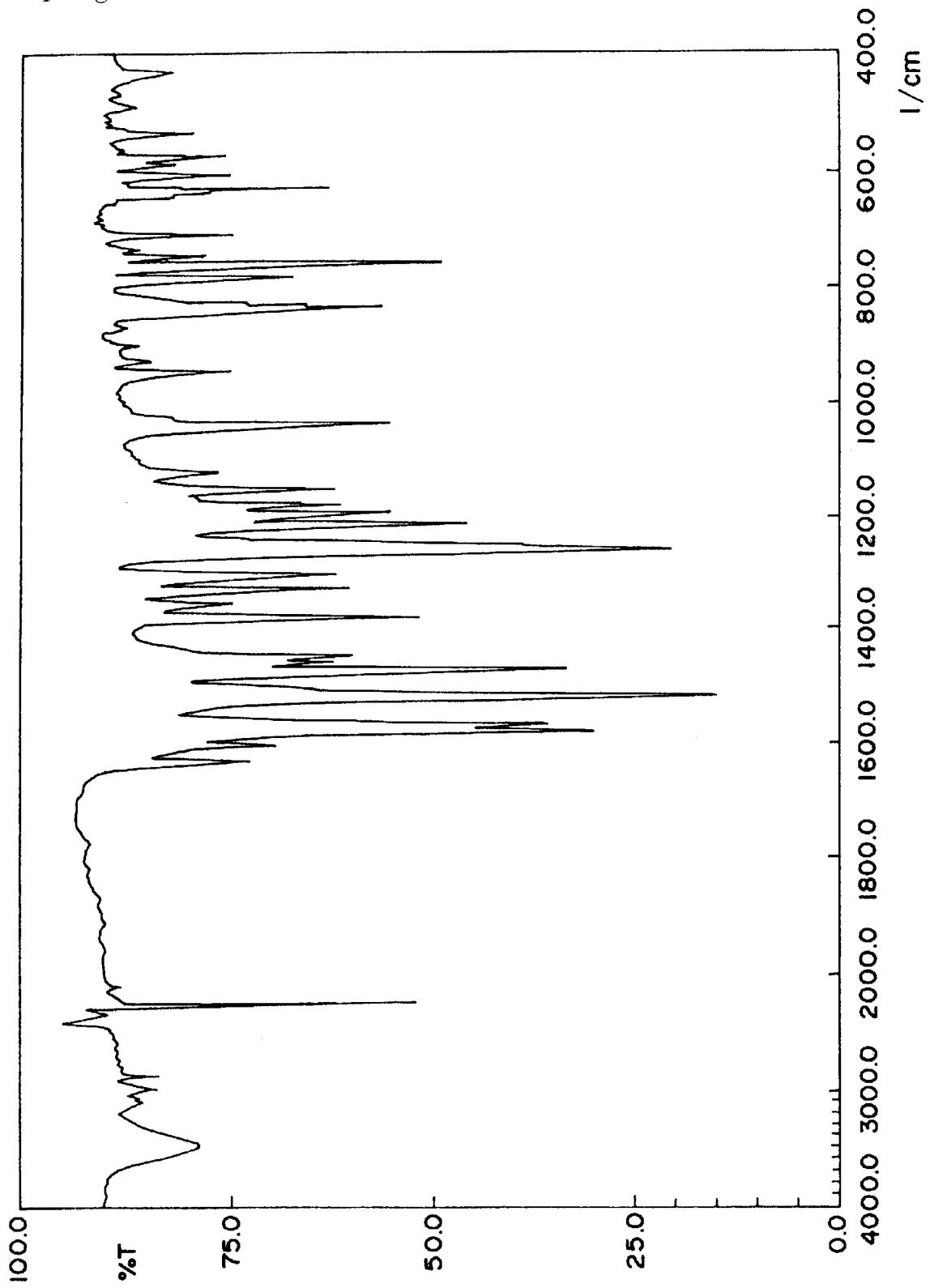
FIG. 9 is an IR chart of the white crystal obtained in (3) of Example 3.

The IR chart of the yellow crystal is shown in FIG. 9.

The yield of the thus synthesized N-(4-methoxyphenyl)-(2,2-dicyanoethenyl)carbazole was 86%, and its melting point was 199–201° C.

(4) Synthesis of N-(4-methoxyphenyl)-3-(tricyanoethenyl)carbazole 1.00 g (2.87 mmol) of N-(4-methoxyphenyl)-3-(2,2-dicyanoethenyl)carbazole and 12.5 ml of N,N-dimethylformamide as solvent were placed in a 500 ml four-necked flask with a mechanical stirrer and bulb-shaped cooler. To this was added an aqueous solution prepared from 0.15 g (2.87 mmol) of sodium cyanide and 0.5 ml of water, which was stirred for 10 minutes. Further, 1.74 g (3.93 mmol) of lead tetraacetate was added. The resultant product was subjected to the reaction for 30 minutes. After the reaction was completed, 100 ml of chloroform was added. To the resultant aqueous solution was added 100 ml of water. The resultant liquid was washed in a separatory funnel. To the washed liquid was added sodium sulfate, which was left to stand for 30 minutes and dehydrated. The dehydrated solution was concentrated in an evaporator and dried under vacuum to obtain a red solid, which was recrystallized in the presence of benzene to obtain 0.30 g of a red crystal.

Figure 10:
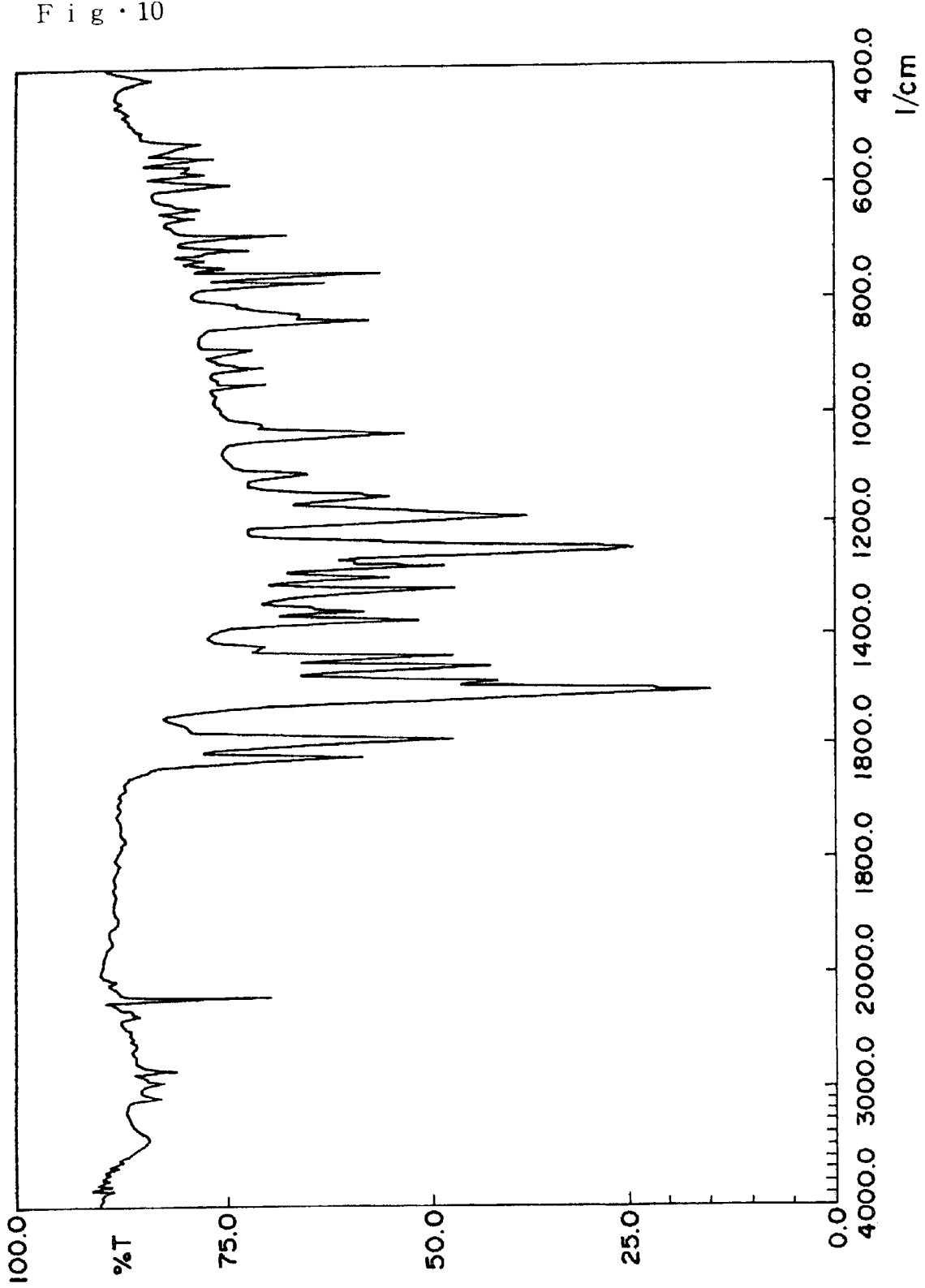
FIG. 10 is an IR chart of the red crystal obtained in (4) of Example 3.

The IR chart of the red crystal is shown in FIG. 10.

The chemical analysis of this red crystal was:

Actual measured vales: 77.12%C, 3.68%H, 14.88%N

Calculated value: 76.99%C, 3.77%H, 14.96%N

The yield of the thus synthesized N-(4-methoxyphenyl)-3-(tricyanoethenyl)carbazole was 28%, and its melting point was 220–222° C.

Figure 11:
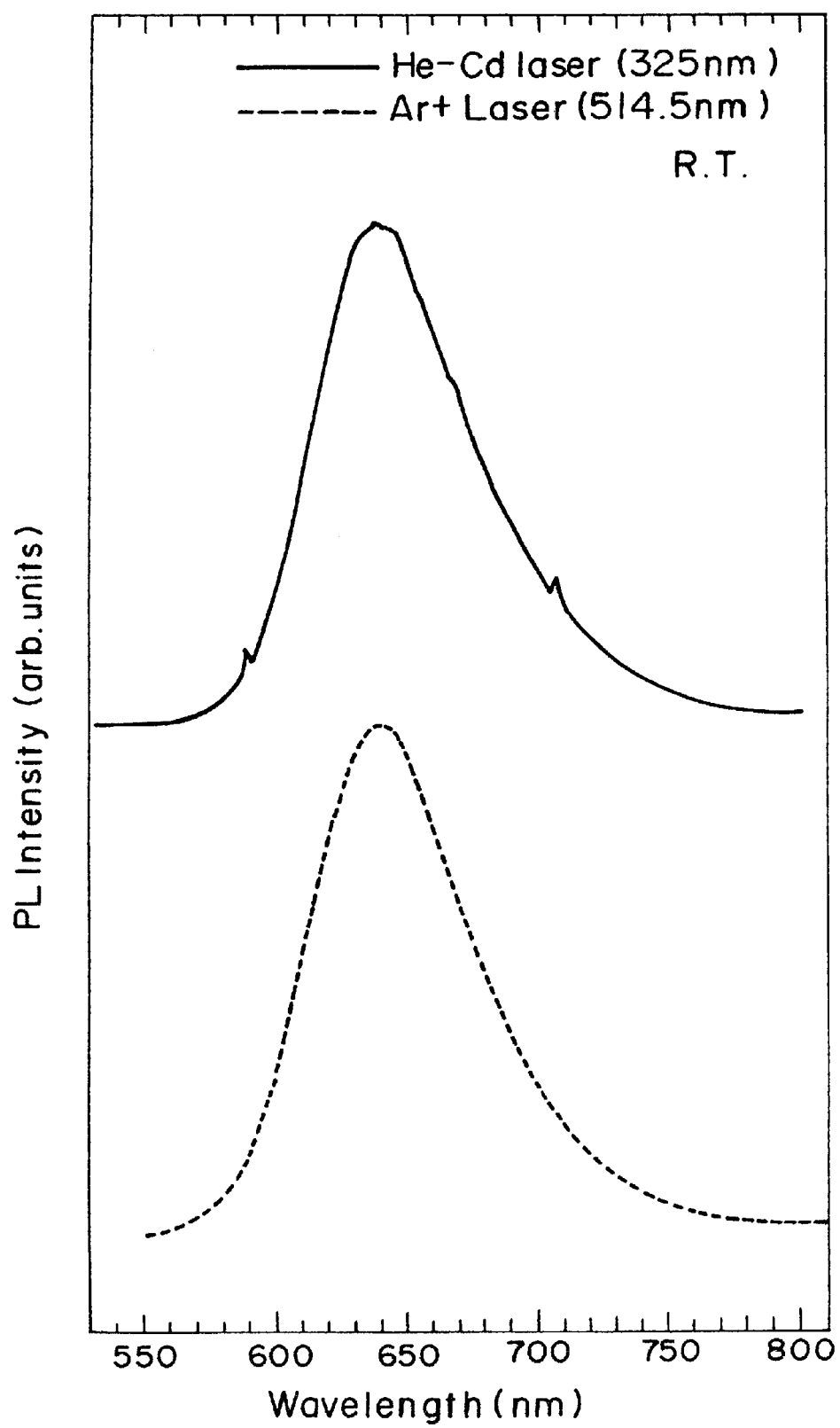
FIG. 11 is a graph showing the relationship between the luminescent strength and luminescent wavelength of N-(4-methoxyphenyl)-3-(tricyanoethenyl) carbazole.

The N-(4-methoxyphenyl)-3-(tricyanoethenyl)carbazole emitted a red light of 640 nm in the maximum wavelength when irradiated at a measuring temperature of 23° C. with a He-Cd laser light (325 nm beam) of 1 mW in intensity and an Ar laser light (514.5 nm beam) of 1 mW in intensity, respectively. A graph showing the relationship between the luminescent wavelength and luminescent strength of the product is shown in FIG. 11.

EXAMPLE 4

Synthesis of N-(4-dimethylaminophenyl)-carbazole-3-caroxaaldehyde 53.5 g (73.3 mmol) of N,N-dimethylformamide was placed in a 300 ml four-necked flask with a mechanical stirrer and bulb-shaped cooler, which was cooled with ice water. To this was added 11.2 g (73.3 mmol) of phosphorus oxychloride, which was stirred for 30 minutes while being cooled with ice. After returning to the ambient temperature, 2.10 g (7.33 mmol) of N-(4-dimethylaminophenyl)carbazole was added. The resultant product was heated to 80° C. in a silicone oil bath, and subjected to the reaction for 2 hours. After the reaction was completed, the product was cooled to the ambient temperature, and then cooled with ice. The solution in the flask was placed in ice, and treated with sodium hydroxide to have a pH of 9 to 10. The liquid was subjected to extraction with chloroform. The resultant chloroform solution was washed with water three times. To the washed solution was added sodium sulfate, which was left to stand and dehydrated. The dehydrated solution was concentrated in an evaporator and dried under vacuum to obtain 1.5 g of a yellow crystal.

Figure 12:
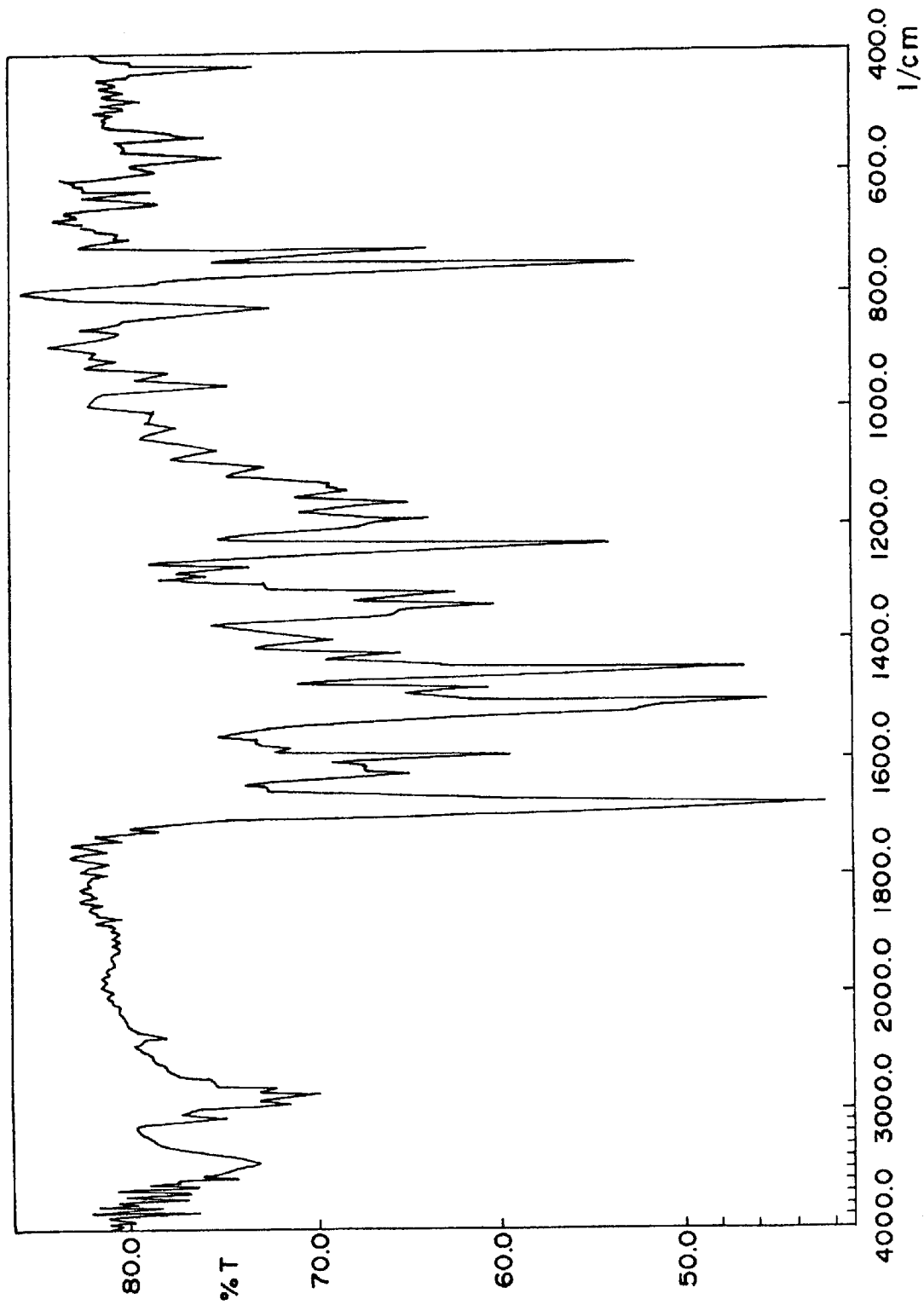
FIG. 12 is an IR chart of N-(4-dimethylaminophenyl)-carbazole-3-carboxaaldehyde obtained in Example 4.

The IR chart of the light yellow crystal is shown in FIG. 12.

The chemical analysis of this red crystal was:

Actual measured vales: 80.35%C, 5.65%H, 8.88%N

Calculated value: 80.23%C, 5.77%H, 8.91%N

The N-(4-dimethylaminophenyl)-carbazole-3-carboxaaldehyde emitted a yellowish green light of 550 in the maximum wavelength when irradiated at a measuring temperature of 23° C. with a He-Cd laser light (325 nm beam) of 1 mW in intensity.

EXAMPLE 5

Synthesis of N-(4-dimethylaminophenyl)-3-(2,2'-dicyanoethenyl)carbazole 1.50 g (4.77 mmol) of N-(4-dimethylaminophenyl)-carbazole-3-carboxaaldehyde and 0.32 g (4.77 mmol) of malononitrile were placed in a 200 ml four-necked flask with a mechanical stirrer and bulb-shaped cooler. To this was added 100 ml of ethanol as solvent. Further, 0.41 g (4.77 mmol) of piperidine was added. The resultant product was heated to 60° C. in a silicone oil bath, and subjected to the reaction for 1.5 hour. After the reaction was completed, the product was cooled down to the ambient temperature. The reaction product was subjected to suction filtration with a glass filter. The resultant solid was washed with a small amount of ethanol to obtain 0.50 g of a red crystal (yield: 29%). The melting of the red crystal was 220–222 ° C.

Figure 13:
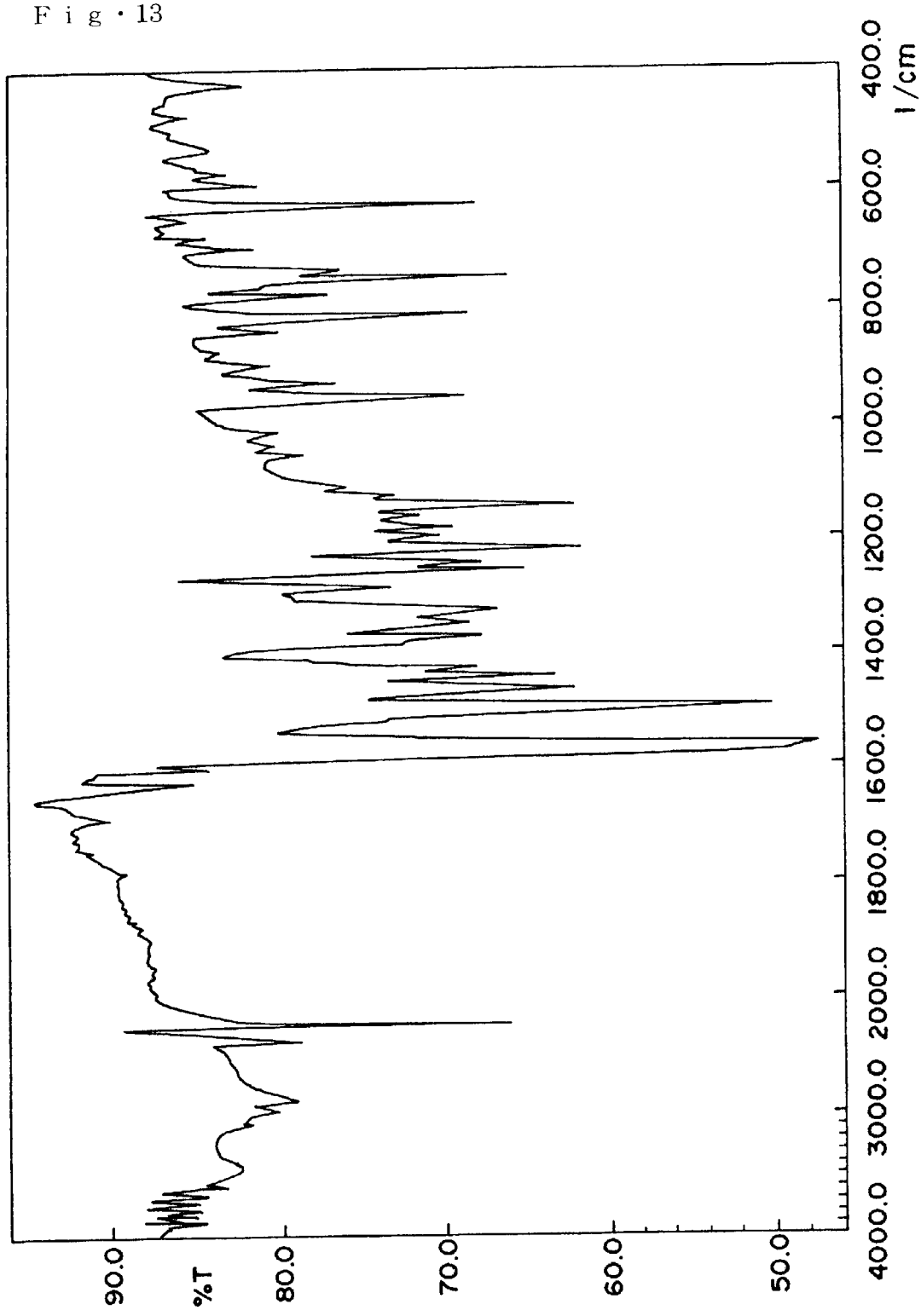
FIG. 13 is an IR chart of N-(4-dimethylaminophenyl)-3-(dicyanoethenyl)carbazole obtained in Example 5.

The IR chart of the red crystal is shown in FIG. 13.

The chemical analysis of this red crystal was:

Actual measured vales: 79.52%C, 4.99%H, 15.38%N

Calculated value: 79.54%C, 5.01%H, 15.46%N

The N-(4-dimethylaminophenyl)-3-(2,2'-dicyanoethenyl)carbazole emitted a red light of 610 nm in the maximum wave length when irradiated at a measuring temperature of 23° C. with a He-Cd laser light (325 nm beam) of 1 mW in intensity.

13

EXAMPLE 6

Synthesis of N-ethyl-3-(2-cyano-2-ethoxycarbonylethenyl)carbazole 2.23 g (10.0 mmol) of N-ethylcarbazole-3-carboxaaldehyde and 1.13 g (10.0 mmol) of ethyl cyanoacetate were placed in a 500 ml four-necked flask with a mechanical stirrer and bulb-shaped cooler. To this was added 15 ml of ethanol as solvent. Further, 0.85 g (10.0 mmol) of piperidine was added. The resultant product was heated to 60° C. in a silicone oil bath, and subjected to the reaction for 15 hours.

After the reaction was completed, the product was cooled down to the ambient temperature and diluted with 100 ml of chloroform. The resultant product was washed with water three times. To this was added sodium sulfate. The resultant product was left to stand, and dehydrated. The resultant solution was concentrated in an evaporator. The resultant solid was recrystallized in the presence of methanol and acetone, and then dried under vacuum to obtain 1.7 g of a yellow crystal.

The yield of the synthesized compound was 53%.

Figure 14:
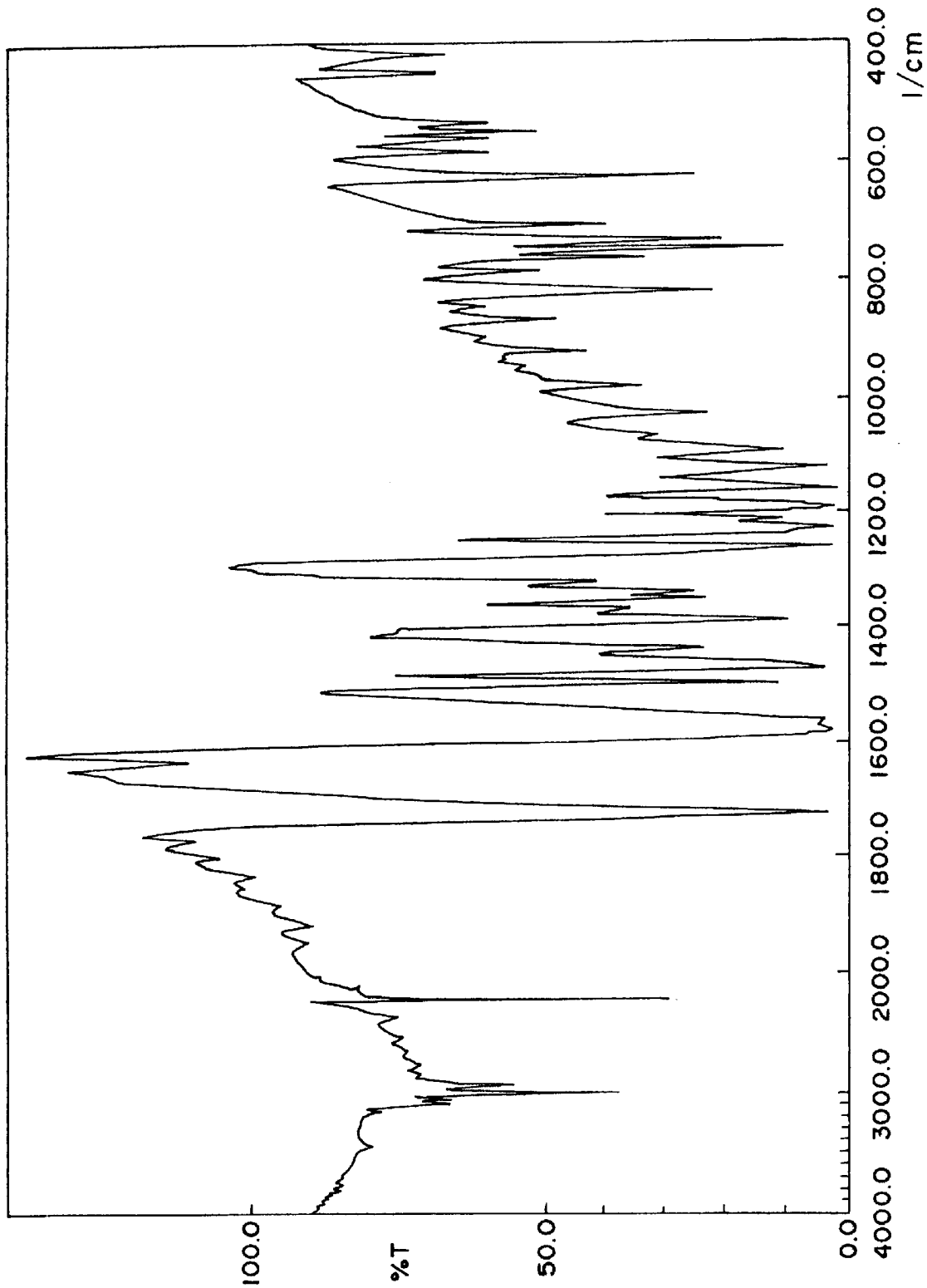
FIG. 14 is an IR chart of N-ethyl-3-(2-cyano-2-ethoxycarbonylethenyl)carbazole obtained in Example 6.

The IR chart of the yellow crystal is shown in FIG. 14.

The chemical analysis of this red crystal was:

Actual measured vales: 75.24%C, 5.48%H, 8.85%N

Calculated value: 75.45%C, 5.70%H, 8.80%N

The N-ethyl-3-(2-cyano-2-ethoxycarbonylethenyl) carbazole emitted a red light of 510 nm in the maximum wavelength when irradiated at a measuring temperature of 23° C. with a He-Cd laser light (325 nm beam) of 1 mW in intensity.

EXAMPLE 7

Synthesis of N-ethyl-3-(1,2-dicyano-2-ethoxycarbonylethenyl)carbazole 1.27 g (4.00 mmol) of N-ethyl-3-(2-cyano-2-ethoxycarbonylethenyl)carbazole and 10 ml of N,N-dimethylformamide as solvent were placed in a 500 ml four-necked flask with a mechanical stirrer and bulb-shaped cooler. To this was added an aqueous solution prepared from 0.20 g (4.08 mmol) of sodium cyanide and 0.4 ml of water, which was stirred for 10 minutes. Further, 1.77 g (4.77 mmol) of lead tetraacetate was added. The resultant product was subjected to the reaction for 30 minutes.

After the reaction was completed, 100 ml of chloroform was added. To the resultant solution was added 100 ml of water. The resultant liquid was washed in a separatory funnel. To the washed liquid was added sodium sulfate, which was left to stand for 30 minutes and dehydrated. The dehydrated solution was concentrated in an evaporator and dried under vacuum to obtain a red solid. The red solid was recrystallized in the presence of benzene to obtain 0.7 g of a vermilion crystal.

The yield of the synthesized compound was 56%, and its melting point was 145–146° C.

Figure 15:
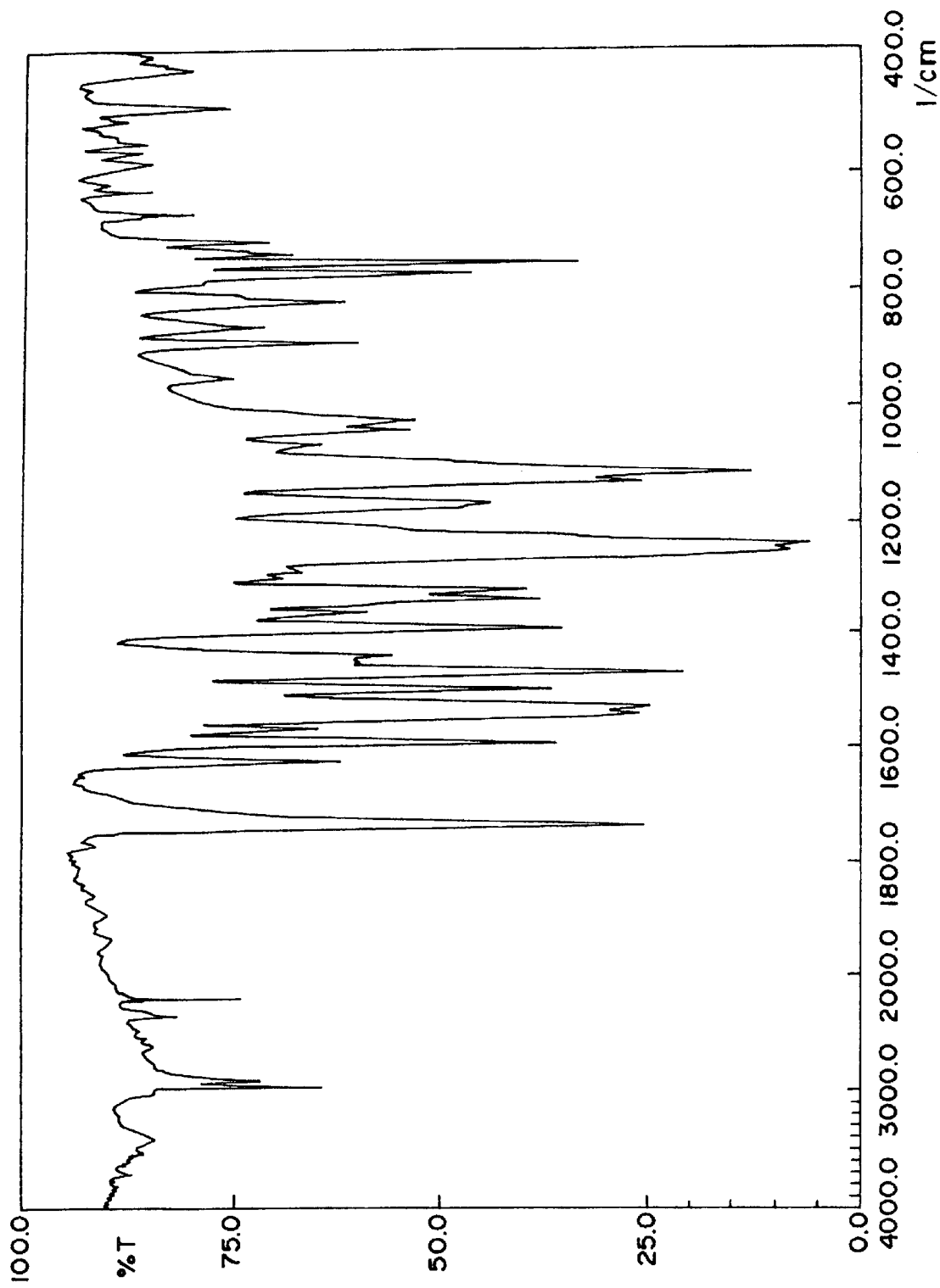
FIG. 15 is an IR chart of N-ethyl-3-(1,2-dicyano-2-ethoxycarbonylethenyl)carbazole obtained in Example 7.

The IR chart of the vermilion crystal is shown in FIG. 15.

The chemical analysis of this red crystal was:

Actual measured vales: 73.12%C, 5.01%H, 12.38%N

Calculated value: 73.45%C, 4.99%H, 12.24%N

The N-ethyl-3-(1,2-dicyano-2-ethoxycarbonylethenyl) carbazole emitted a red light of 640 nm in the maximum wavelength when irradiated at a measuring temperature of 23° C. with a He-Cd laser light (325 nm beam) of 1 mW in intensity.

14

EXAMPLE 8

Figure 16:
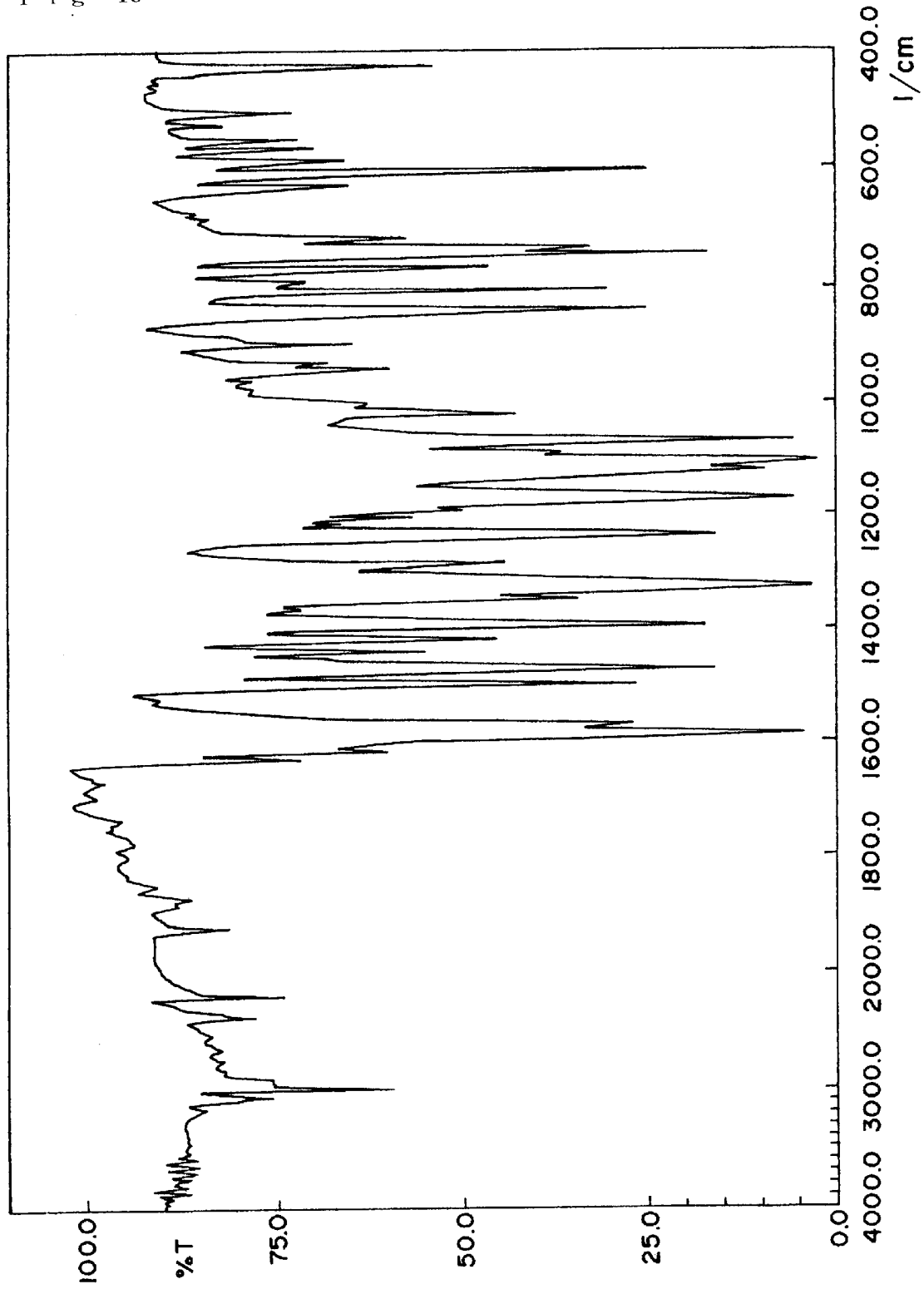
FIG. 16 is an IR chart of the yellow crystal obtained in (1) of Example 8.

Synthesis of N-ethyl-3-(1,2-dicyano-2-(4-trifluoromethylphenyl)ethenyl)carbazole (1) Synthesis of N-ethyl-3-(2-cyano-2-(4-trifluoromethylphenyl)ethenyl)carbazole 0.93 g (5.40 mmol) of N-ethylcarbazole-3-carboxaaldehyde and 1.0 g (5.40 mmol) of (4-trifluormethyl)phenylacetonitrile solvent were placed in a 200 ml four-necked flask with a mechanical stirrer and bulb-shaped cooler. To this was added 30 ml of ethanol as solvent. Further, 0.46 g (5.40 mmol) of piperidine was added. The resultant product was heated to 60° C. in a silicone oil bath, and subjected to the reaction for 4.0 hours. After the reaction was completed, the product was cooled down to the temperature of ice. The reaction product was subjected to suction filtration with a glass filter. The resultant solid was washed with a small amount of ethanol to obtain 1.2 g of a yellow solid. The yield of the synthesized compound was 56%, and its melting point was 164–165° C. The IR chart of the vermilion crystal is shown in FIG. 16.

Figure 17:
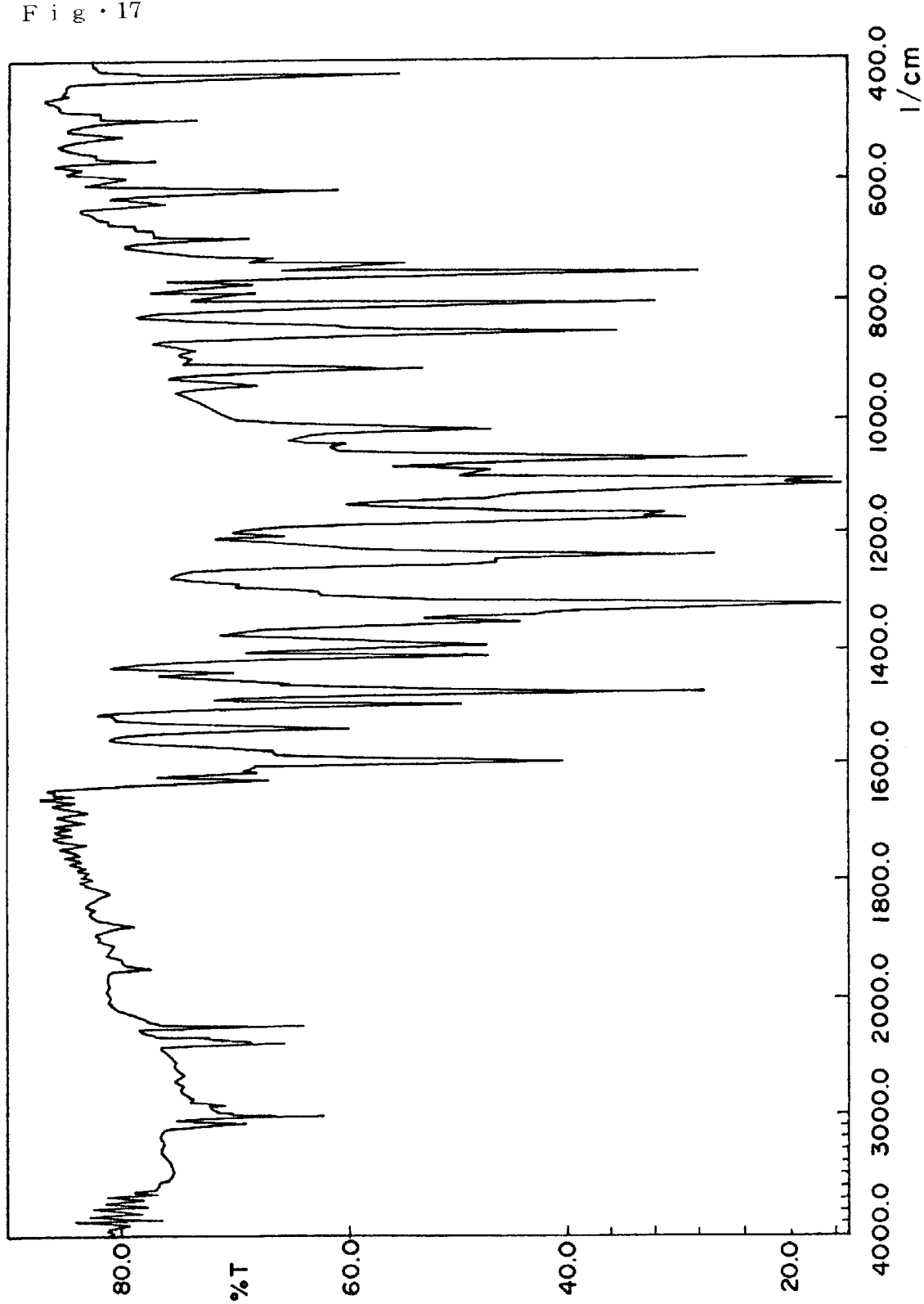
FIG. 17 is an IR chart of the yellow crystal obtained in (2) of Example 8.

(2) Synthesis of N-ethyl-3-(1,2-dicyano-2-(4-trifluoromethylphenyl)ethenyl)carbazole 0.78 g (2.00 mmol) of N-ethyl-3-(2-cyano-2-(4-trifluoromethylphenyl)ethenyl) carbazole and 10 ml of N,N-dimethylformamide as solvent were placed in a 200 ml four-necked flask with a mechanical stirrer and bulb-shaped cooler. To this was added an aqueous solution prepared from 0.10 g (2.00 mmol) of sodium cyanide and 1.0 ml of water, which was stirred for 10 minutes. Further, 0.88 g (2.00 mmol) of lead tetraacetate was added. The resultant product was subjected to the reaction for 30 minutes. After the reaction was completed, 100 ml of chloroform was added. To the resultant solution was added 50 ml of water. The resultant liquid was washed in a separatory funnel. To the washed liquid was added sodium sulfate, which was left to stand for 30 minutes and dehydrated. The dehydrated solution was concentrated in an evaporator and dried under vacuum to obtain 0.20 g of a yellow solid. The yield of the synthesized compound was 24%, and its melting point was 180–182° C. The IR chart is shown in FIG. 17.

The chemical analysis of this red crystal was:

Actual measured vales: 73.92%C, 4.53%H, 7.20%N

Calculated value: 73.84%C, 4.39%H, 7.18%N

EXAMPLE 9

Figure 18:
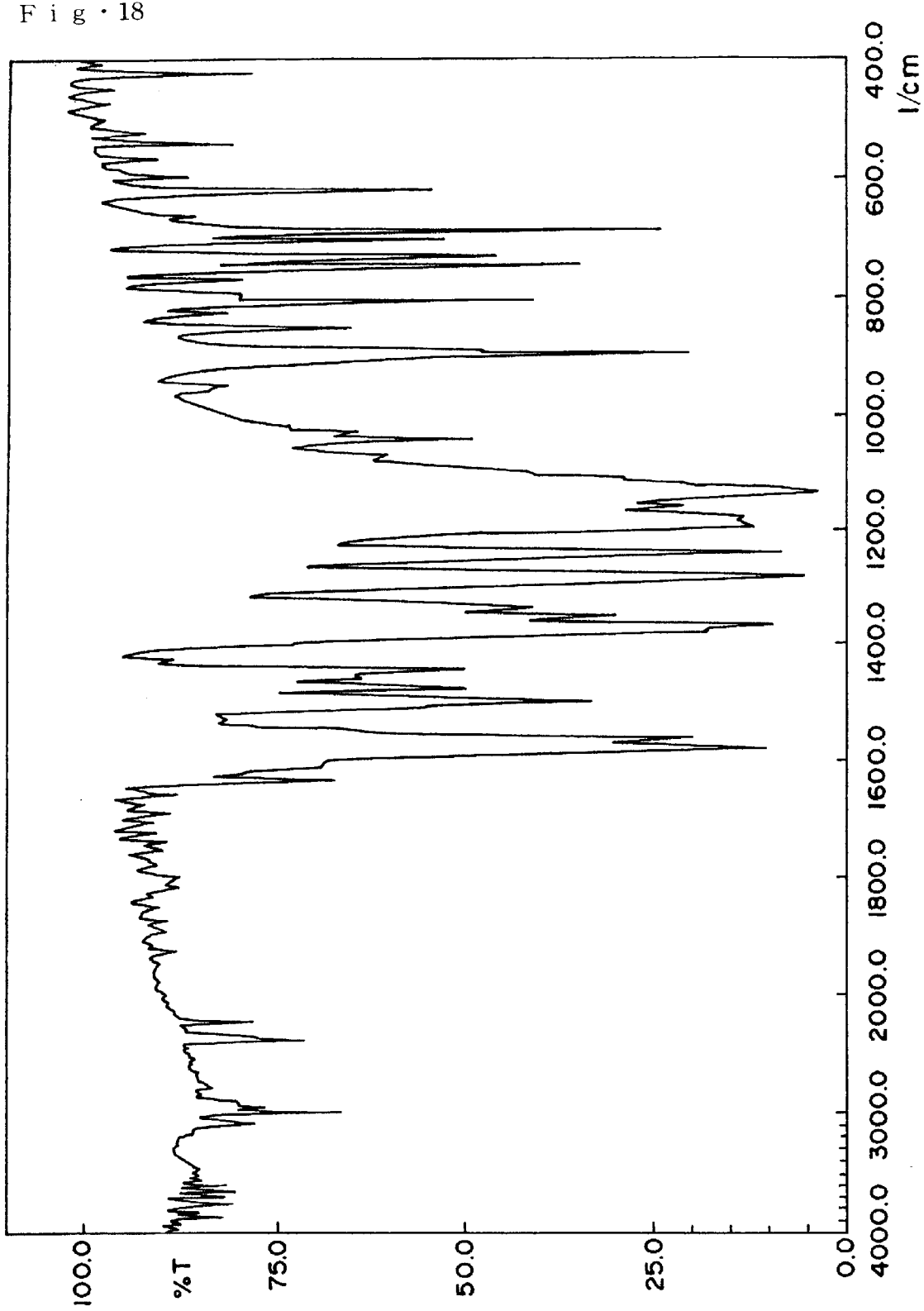
FIG. 18 is an IR chart of the yellow crystal obtained in (1) of Example 9.

Synthesis of N-ethyl-3-(1,2-dicyano-2-(3,5-bis(trifluoromethyl)phenyl)ethenyl)carbazole (1) Synthesis of N-ethyl-3-(2-cyano-2-(3,5-bis(trifluoromethyl)phenyl)ethenyl)carbazole 0.88 g (3.95 mmol) of N-ethylcarbazole-3-carboxaaldehyde and 1.0 g (3.95 mmol) of 3,5-bis(trifluoromethyl)phenylacetonitrile were placed in a 200 ml four-necked flask with a mechanical stirrer and bulb-shaped cooler. To this was added 30 ml of ethanol as solvent. Further, 0.34 g (3.95 mmol) of piperidine was added. The resultant product was heated to 60° C. in a silicone oil bath, and subjected to the reaction for 4.0 hours. After the reaction was completed, the product was cooled down to the temperature of ice. The reaction product was subjected to suction filtration with a glass filter. The resultant solid was washed with a small amount of ethanol to obtain 1.5 g of a yellow solid. The yield of the synthesized compound was 83%, and its melting point was 164–165° C. The IR chart of the vermilion crystal is shown in FIG. 18.

Figure 19:
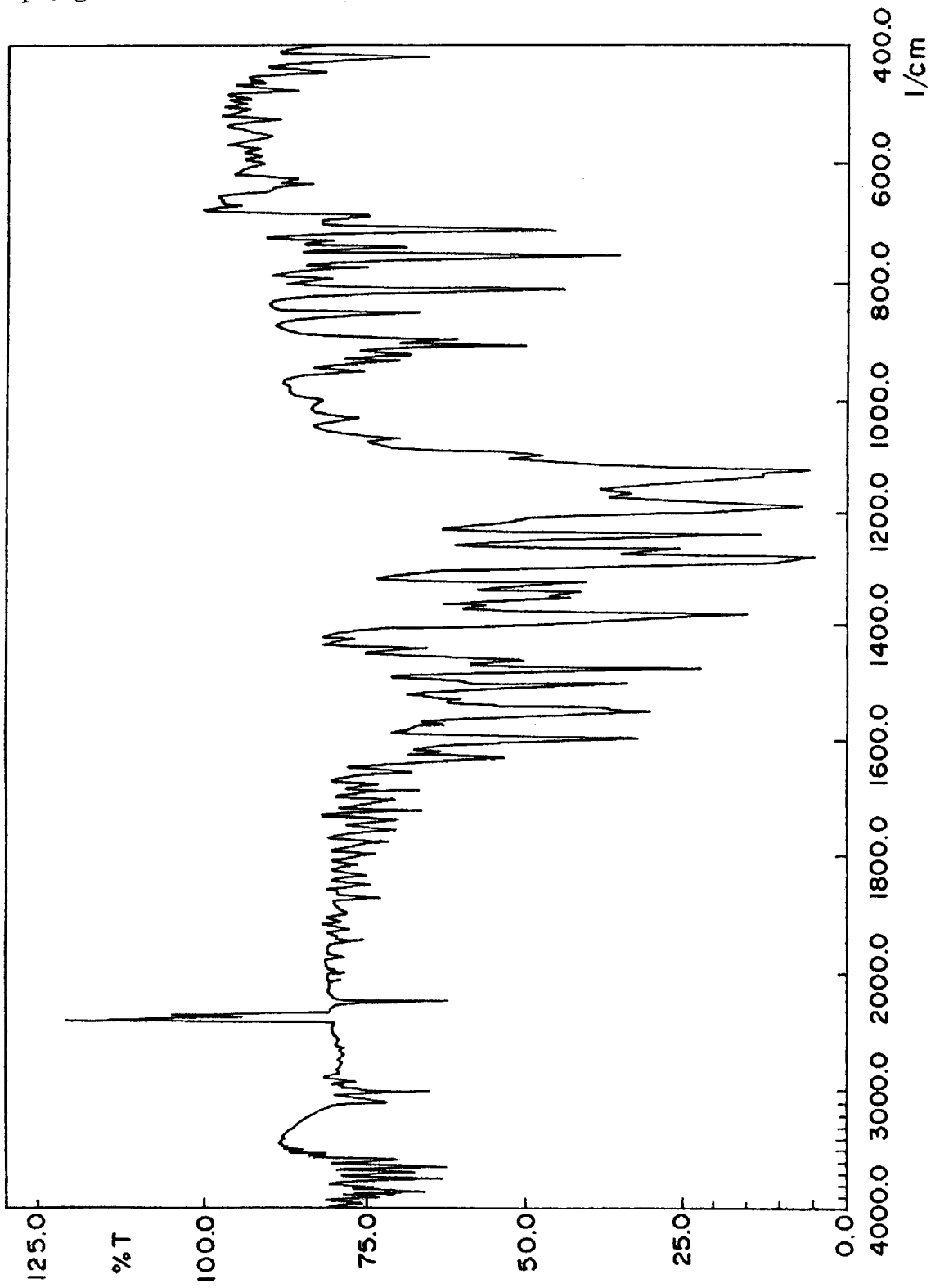
FIG. 19 is an IR chart of the brown crystal obtained in (2) of Example 9.

(2) Synthesis of N-ethyl-3-(1,2-dicyano-2-(3,5-bis (trifluoromethyl)phenyl)ethenyl)carbazole 1.0 g (2.18 mmol) of N-ethyl-3-(2-cyano-2-(3,5-bis (trifluoromethyl)phenyl)ethenyl) carbazole and 10 ml of N,N-dimethylformamide as solvent were placed in a 200 ml four-necked flask with a mechanical stirrer and bulb-shaped cooler. To this was added an aqueous solution prepared from 0.11 g (2.25 mmol) of sodium cyanide and 1.0 ml of water, which was stirred for 10 minutes. Further, 1.0 g (2.25 mmol) of lead tetraacetate was added. The resultant product was subjected to the reaction for 30 minutes. After the reaction was completed, 100 ml of chloroform was added. To the resultant solution was added 50 ml of water. The resultant liquid was washed in a separatory funnel. To the washed liquid was added sodium sulfate, which was left to stand for 30 minutes and dehydrated. The dehydrated solution was concentrated in an evaporator and dried under vacuum to obtain 0.25 g of a brown solid. The yield of the synthesized compound was 24%, and its melting point was 180–182° C. The IR chart is shown in FIG. 19.

The chemical analysis of this brown crystal was:

Actual measured vales: 64.48%C, 3.24%H, 8.87%N

Calculated value: 64.60%C, 3.13%H, 8.69%N

EXAMPLE 10

Figure 20:
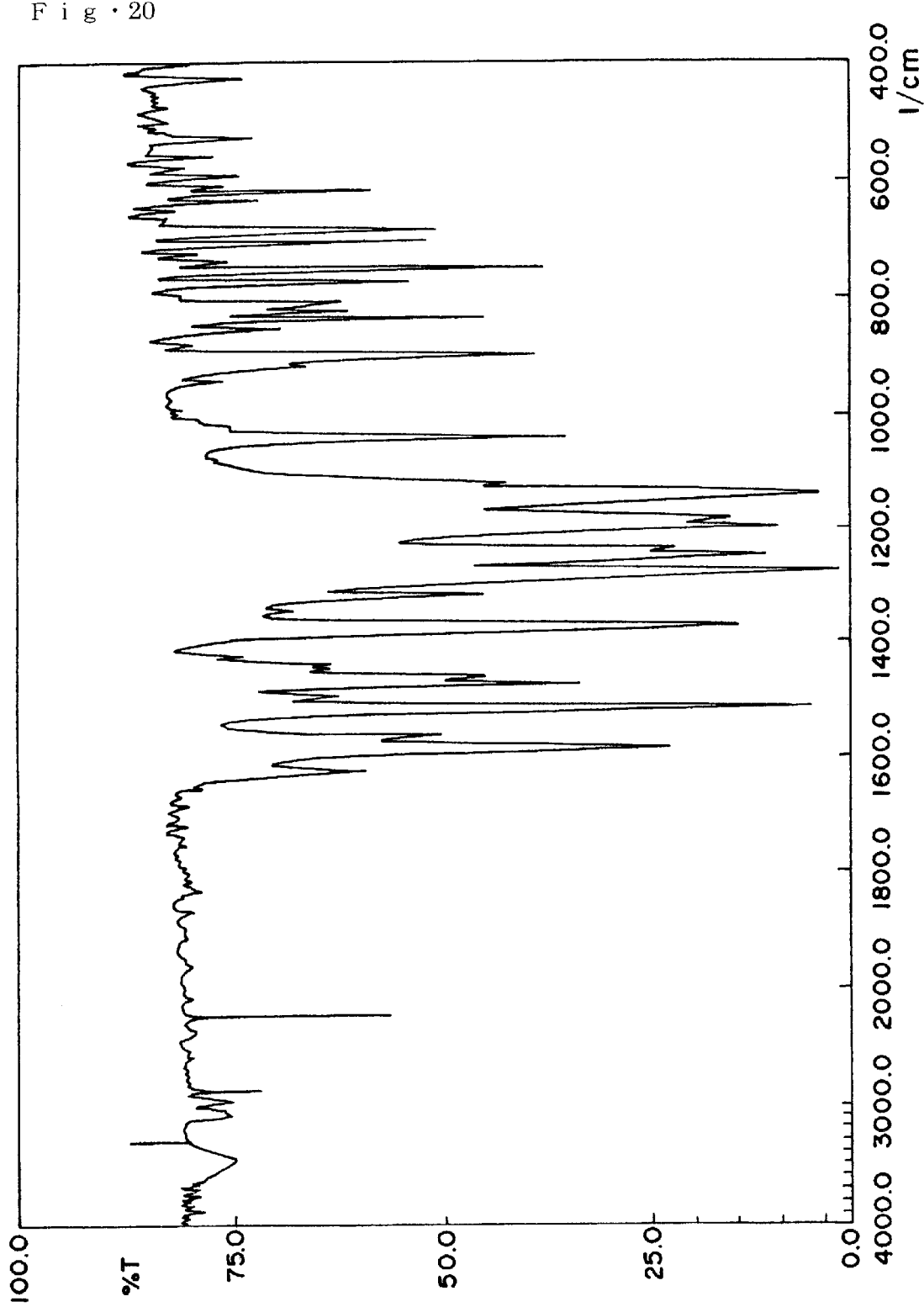
FIG. 20 is an IR chart of the yellow crystal obtained in (1) of Example 10.

Synthesis of N-(4-methoxyphenyl)-3-(1,2-dicyano-2-(3,5-bis(trifluoromethyl)phenyl)ethenyl)carbazole (1) Synthesis of N-(4-methoxyphenyl)-3-(2-cyano-2-(3,5-bis(trifluoromethyl)phenyl)ethenyl)carbazole 0.59 g (1.96 mmol) of N-(4-methoxyphenyl)carbazole-3-carboxaaldehyde and 0.50 g (1.96 mmol) of 3,5-bis (trifluoromethyl)phenylacetonitrile were placed in a 200 ml four-necked flask with a mechanical stirrer and bulb-shaped cooler. To this was added 15 ml of ethanol as solvent. Further, 0.17 g (1.96 mmol) of piperidine was added. The resultant product was heated to 60° C. in a silicone oil bath, and subjected to the reaction for 4.0 hours. After the reaction was completed, the product was cooled down to the temperature of ice. The reaction product was subjected to suction filtration with a glass filter. The resultant solid was washed with a small amount of ethanol to obtain 0.60 g of a yellow solid. The yield of the synthesized compound was 94%, and its melting point was 198–200° C. The IR chart is shown in FIG. 20.

Figure 21:
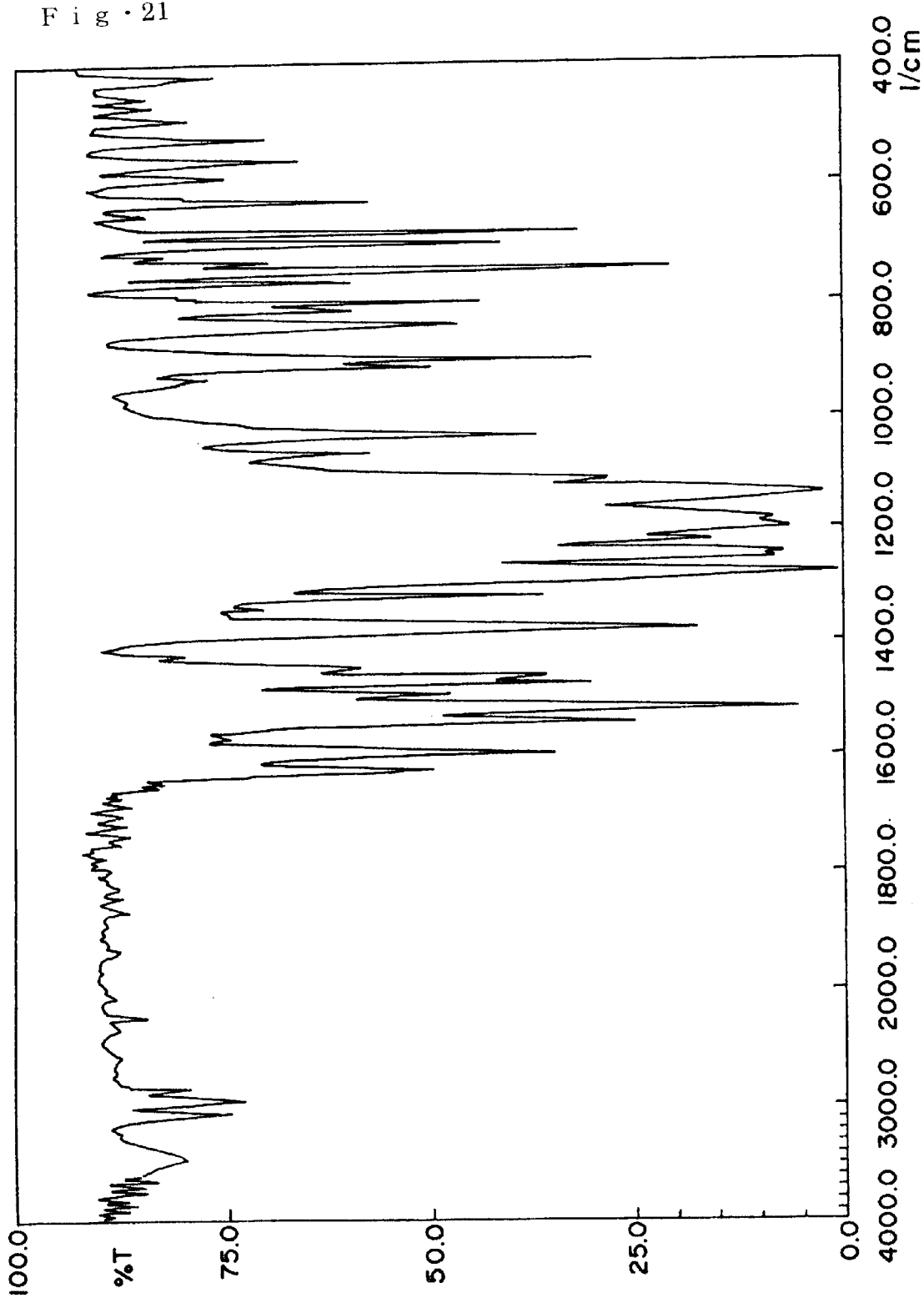
FIG. 21 is an IR chart of the orange crystal obtained in (2) of Example 10.

(2) Synthesis of N-methoxyphenyl)-3-(1,2-dicyano-2-(3,5-bis(trifluoromethyl)phenyl)ethenyl)carbazole 0.50 g (0.93 mmol) of N-(4-methoxyphenyl)-3-(2-cyano-2-(3,5-bis(trifluoromethyl) phenyl)ethenyl)carbazole and 5 ml of N,N-dimethylformamide as solvent were placed in a 200 ml four-necked flask with a mechanical stirrer and bulb-shaped cooler. To this was added an aqueous solution prepared from 0.05 g (1.00 mmol) of sodium cyanide and 0.5 ml of water, which was stirred for 10 minutes. Further, 0.44 g (1.00 mmol) of lead tetraacetate was added. The resultant product was subjected to the reaction for 30 minutes. After the reaction was completed, 20 ml of chloroform was added. To the resultant solution was added 20 ml of water. The resultant liquid was washed in a separatory funnel. To the washed liquid was added sodium sulfate, which was left to stand for 30 minutes and dehydrated. The dehydrated solution was concentrated in an evaporator and dried under vacuum to obtain a vermilion solid. The vermilion solid was recrystallized in the presence of ethanol to obtain 0.10 g of an orange crystal. The yield of the synthesized orange crystal was 19%, and its melting point was 170–172° C. The IR chart is shown in FIG. 21.

The chemical analysis of this orange crystal was:

Actual measured vales: 66.01%C, 2.96%H, 7.63%N

Calculated value: 66.31%C, 3.05%H, 7.48%N

EXAMPLE 11

Figure 22:
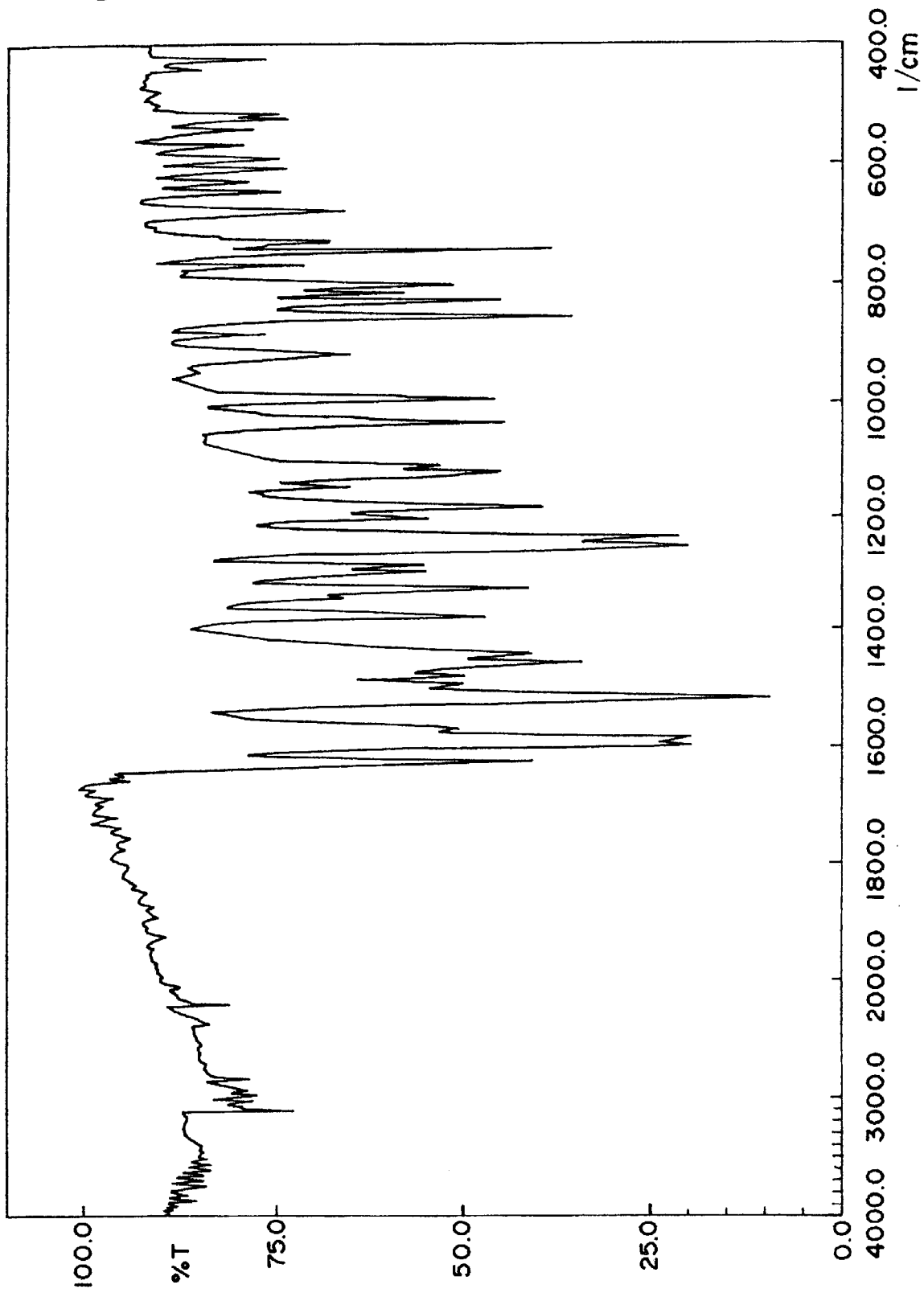
FIG. 22 is an IR chart of the yellow crystal obtained in (1) of Example 11.

Synthesis of N-(4-methoxyphenyl)-3-(1,2-dicyano-2-(3,5- difluorophenyl)ethenyl)carbazole (1) Synthesis of N-(4-methoxyphenyl)-3-(2-cyano-2-(3,5-difluorophenyl)ethenyl)carbazole 0.98 g (3.27 mmol) of N-(4-methoxyphenyl)carbazole-3-carboxaaldehyde and 0.50 g (3.27 mmol) of 3,5-difluorophenylacetonitrile were placed in a 200 ml four-necked flask with a mechanical stirrer and bulb-shaped cooler. To this was added 20 ml of ethanol as solvent. Further, 0.28 g (3.27 mmol) of piperidine was added. The resultant product was heated to 60° C. in a silicone oil bath, and subjected to the reaction for 4.0 hours. After the reaction was completed, the product was cooled down to the temperature of ice. The reaction product was subjected to suction filtration with a glass filter. The resultant solid was washed with a small amount of ethanol to obtain 0.60 g of a yellow solid. The yield of the synthesized compound was 42%, and its melting point was 200–203° C. The IR chart is shown in FIG. 22.

Figure 23:
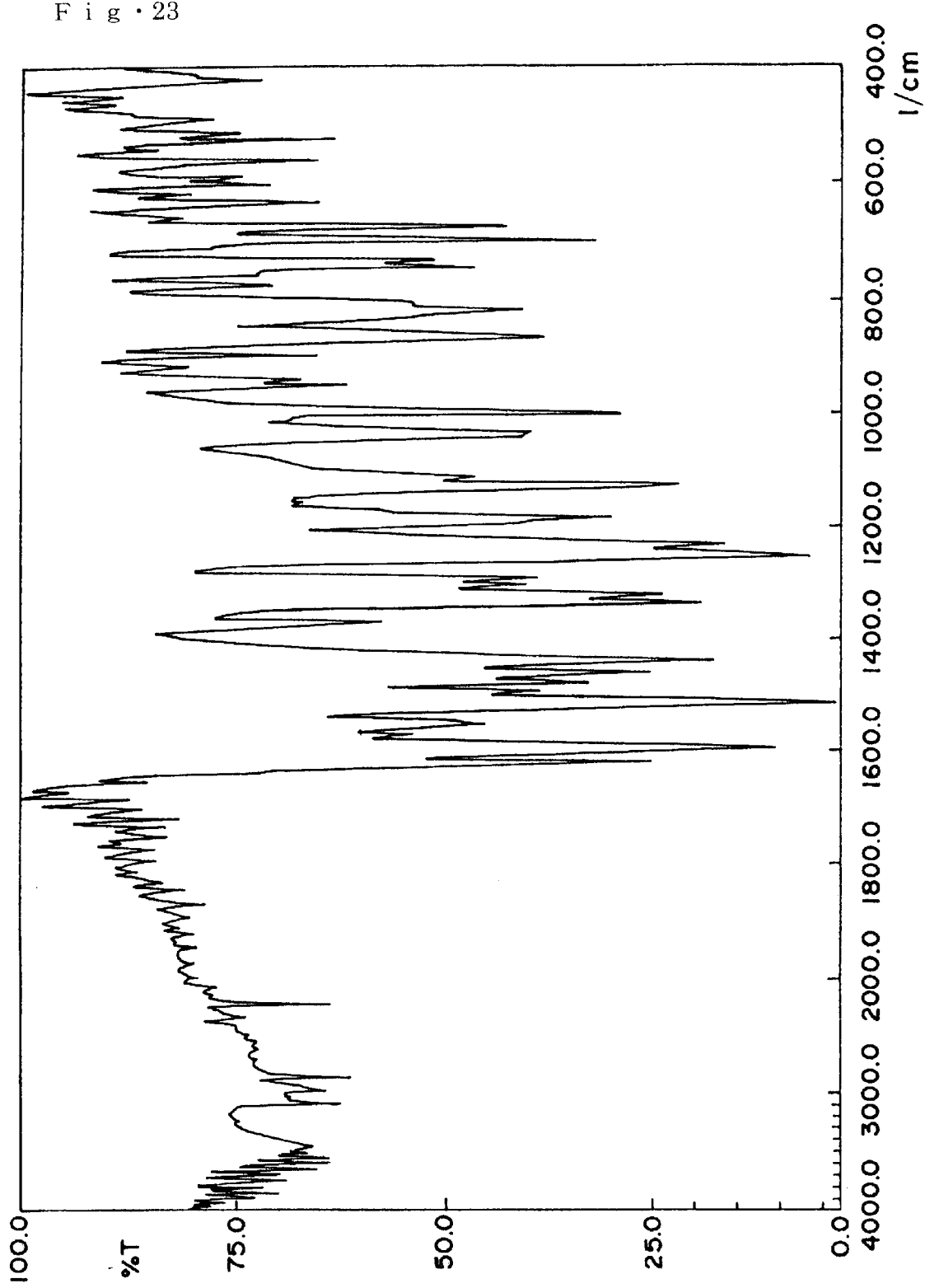
FIG. 23 is an IR chart of the vermilion crystal obtained in (2) of Example 11.

(2) Synthesis of N-(4-methoxyphenyl)-3-(1,2-dicyano-2-(3,5-difluorophenyl)ethenyl)carbazole 0.50 g (1.15 mmol) of N-(4-methoxyphenyl)-3-(2-cyano-2-(3,5-difluorophenyl)ethenyl) carbazole and 5 ml of N,N-dimethylformamide as solvent were placed in a 200 ml four-necked flask with a mechanical stirrer and bulb-shaped cooler. To this was added an aqueous solution prepared from 0.06 g (1.15 mmol) of sodium cyanide and 0.5 ml of water, which was stirred for 10 minutes. Further, 0.51 g (1.15 mmol) of lead tetraacetate was added. The resultant product was subjected to the reaction for 30 minutes. After the reaction was completed, 20 ml of chloroform was added. To the resultant solution was added 20 ml of water. The resultant liquid was washed in a separatory funnel. To the washed liquid was added sodium sulfate, which was left to stand for 30 minutes and dehydrated. The dehydrated solution was concentrated in an evaporator and dried under vacuum to obtain a vermilion solid. The vermilion solid was recrystallized in the presence of ethanol to obtain 0.10 g of a vermilion crystal. The yield of the synthesized orange crystal was 19%, and its melting point was 140–142° C. The IR chart is shown in FIG. 23.

The chemical analysis of this orange crystal was:

Actual measured vales: 75.63%C, 3.88%H, 9.02%N

Calculated value: 75.48%C, 3.71%H, 9.11%N

EXAMPLE 12

Figure 24:
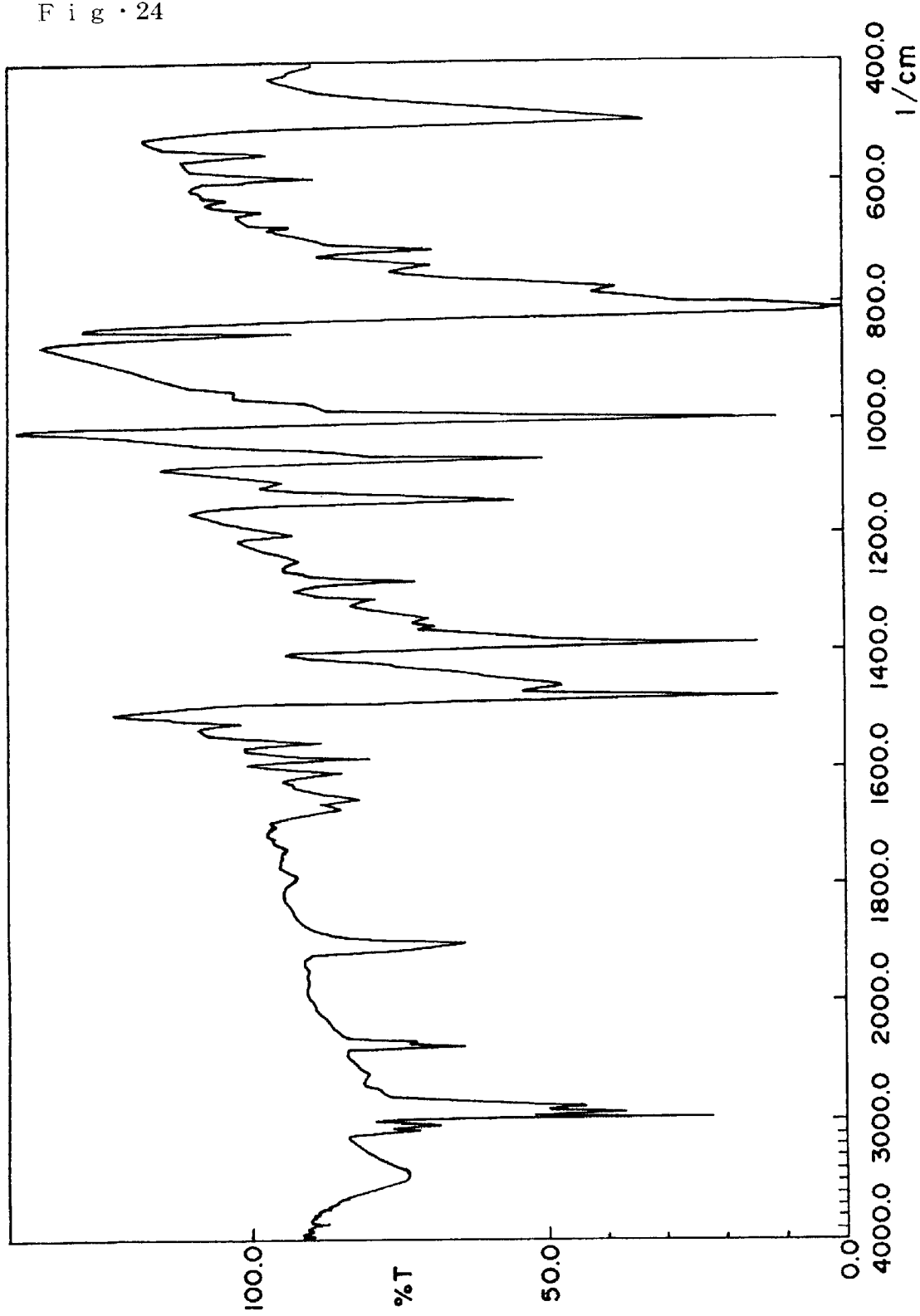
FIG. 24 is an IR chart of the white solid obtained in (1) of Example 12.

Synthesis of ethylbiphenylcarbazole derivative (1) Synthesis of 4-iodo-4'-ethylbiphenyl 25.0 g (137 mmol) of 4-ethylbiphenyl, 7.23 g (27.4 mmol) of orthoperiodic acid, 13.9 g (54.9 mmol) of iodine, 133 ml of acetic acid, 27 ml of water and 4.1 ml of sulfuric acid were placed in a 500 ml three-necked flask with a mechanical stirrer and bulb-shaped cooler. This was heated to 70° C. in a water bath, and subjected to the reaction for 2 hours. The product was cooled down to the ambient temperature. To this was added 300 ml of water, which was subjected to the extraction with chloroform. The resultant chloroform phase was washed with sodium thiosulfate and water in this order. To this was added sodium sulfate, and the dehydration was carried out. After the filtration was carried out, the chloroform was distilled away in an evaporator to obtain a light yellow solid. The resultant solid was recrystallized in the presence of ethanol to obtain a white crystal. The yield of the compound was 71%. Its melting point was 145–149° C. The IR chart is shown in FIG. 24.

Figure 25:
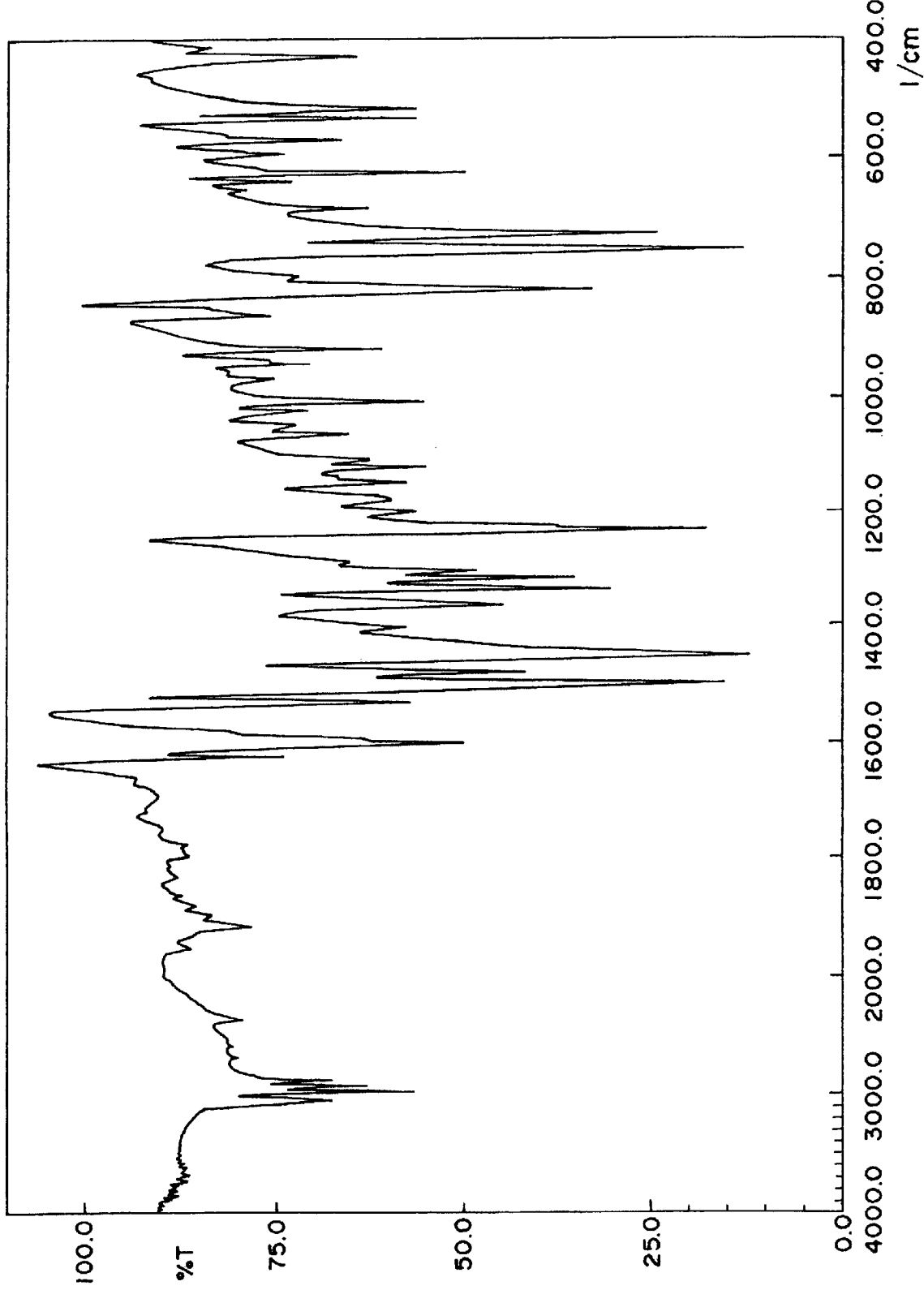
FIG. 25 is an IR chart of the light-colored crystal obtained in (2) of Example 12.

(2) Synthesis of N-(4'-ethyl-4-biphenyl)carbazole 13.11 g (78.4 mmol) of carbazole, 29.0 g (94.1 mmol) of 4-iodo-4'-ethylbiphenyl, 0.83 g (13.1 mmol) of copper powder, 6.91 g (26.4 mmol) of 18-crown-6-ether and 11.92 g (86.2 mmol) of potassium carbonate were placed in a 1000 ml three-necked flask with a mechanical stirrer and bulb-shaped cooler. To this was added 200 ml of o-dichlorobenzene as solvent. This was heated to 180° C. under a nitrogen flow in a silicone oil bath. The reaction was continued for 68 hours. After the reaction was completed, the reaction product was subjected to suction filtration with a suction funnel, before it was cooled down. The resultant filtrate was concentrated in an evaporator. To the resultant oily product was added 200 ml of methanol. The precipitated solid was subjected to the filtration at a reduced pressure with a suction funnel to obtain a gray solid, which was recrystallized in the presence of benzene to obtain 15.7 g of a lightly colored crystal. The yield of the resultant compound was 58%, and its melting point was 208–210° C. The IR chart is shown in FIG. 25.

(3) Synthesis of N-(4'-ethyl-4-biphenyl)carbazole-3-carboxaaldehyde 31.5 g (432 mmol) of N,N-dimethylformamide was placed in a 300 ml three-necked flask with a mechanical stirrer and bulb-shaped cooler, which was cooled with ice water. To this was added 66.2 g (432 mmol) of phosphorus oxychloride, which was stirred for 30 minutes while being cooled with ice. After returning to the ambient temperature, 15.0 g (43.2 mmol) of N-(4'-ethyl-4-biphenyl)carbazole was added. The resultant product was heated to 85° C. in a silicone bath, and subjected to the reaction for 1.5 hour. After the reaction was completed, the product was cooled to the ambient temperature, and then cooled with ice. The solution in the flask was placed in ice, and treated with sodium hydroxide to have a pH of 9 to 10. The solution was subjected to extraction with chloroform. The resultant chloroform solution was washed with water three times. To the washed solution was added sodium sulfate, which was left to stand and dehydrated. The dehydrated solution was concentrated in an evaporator and dried under vacuum to obtain a brown crystal. The solid was recrystallized in the presence of acetone and methanol to obtain 5.2 g of a light brown crystal.

Figure 26:
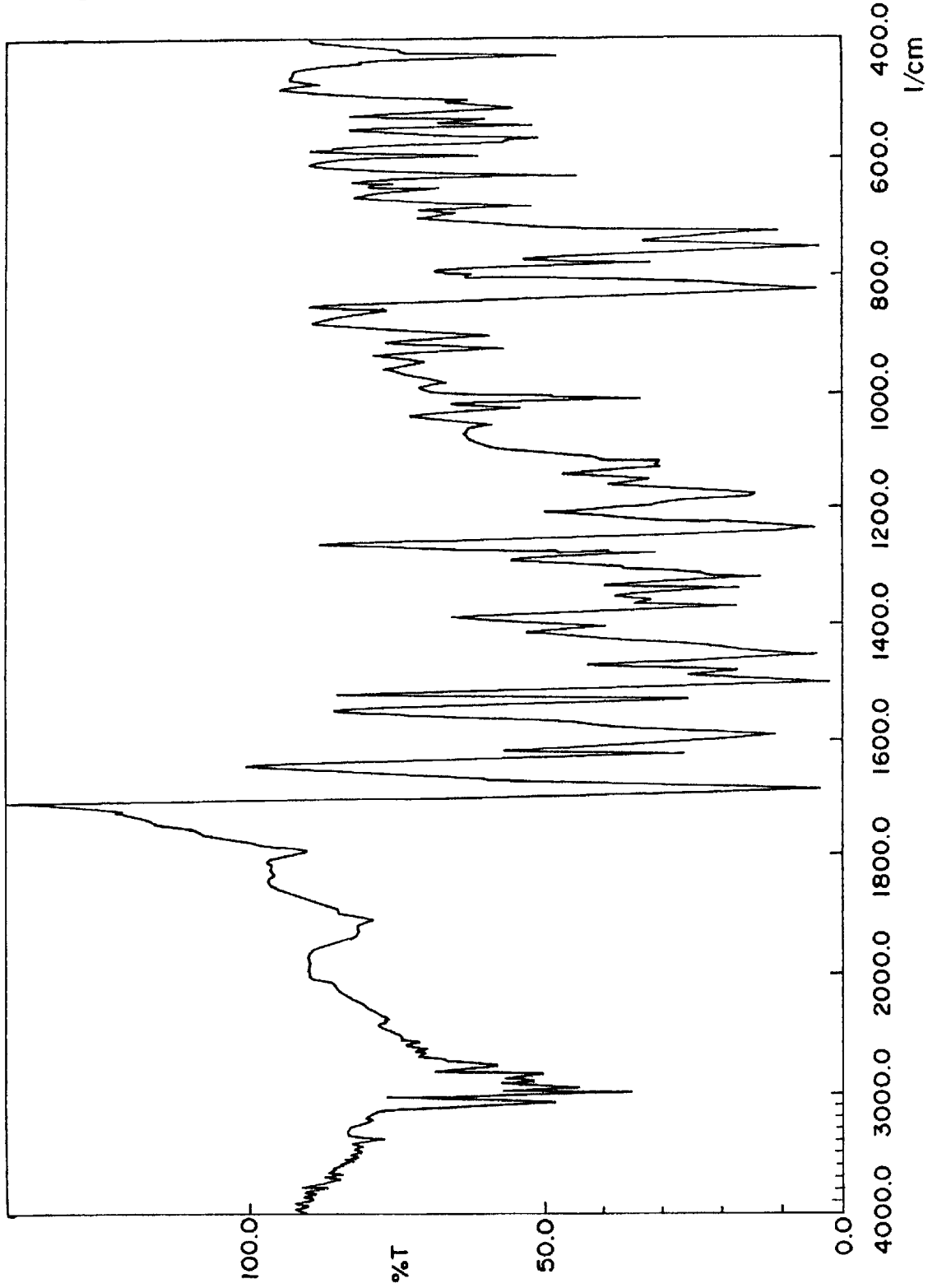
FIG. 26 is an IR chart of the light brown crystal obtained in (3) of Example 12.

The yield of the resultant crystal was 32%, and its melting point was 174–178° C. The IR chart is shown in FIG. 26.

(4) Synthesis of N-(4'-ethyl-4-biphenyl)-3-(dicyanovinyl)carbazole 1.20 g (3.20 mmol) of N-(4'-ethyl-4-biphenyl)carbazole-3-carboxaaldehyde and 0.23 g (3.20 mmol) of malononitrile were placed in a 200 ml four-necked flask with a mechanical stirrer and bulb-shaped cooler. To this was added 30 ml of ethanol as solvent. Further, 0.30 g (3.20 mmol) of piperidine was added. The resultant product was heated to 60° C. in a silicone oil bath, and subjected to the reaction for 1.0 hour. After the reaction was completed, the product was cooled down to the ambient temperature. The reaction product was subjected to suction filtration with a glass filter. The resultant solid was washed with a small amount of ethanol to obtain 1.20 g of a yellow solid.

Figure 27:
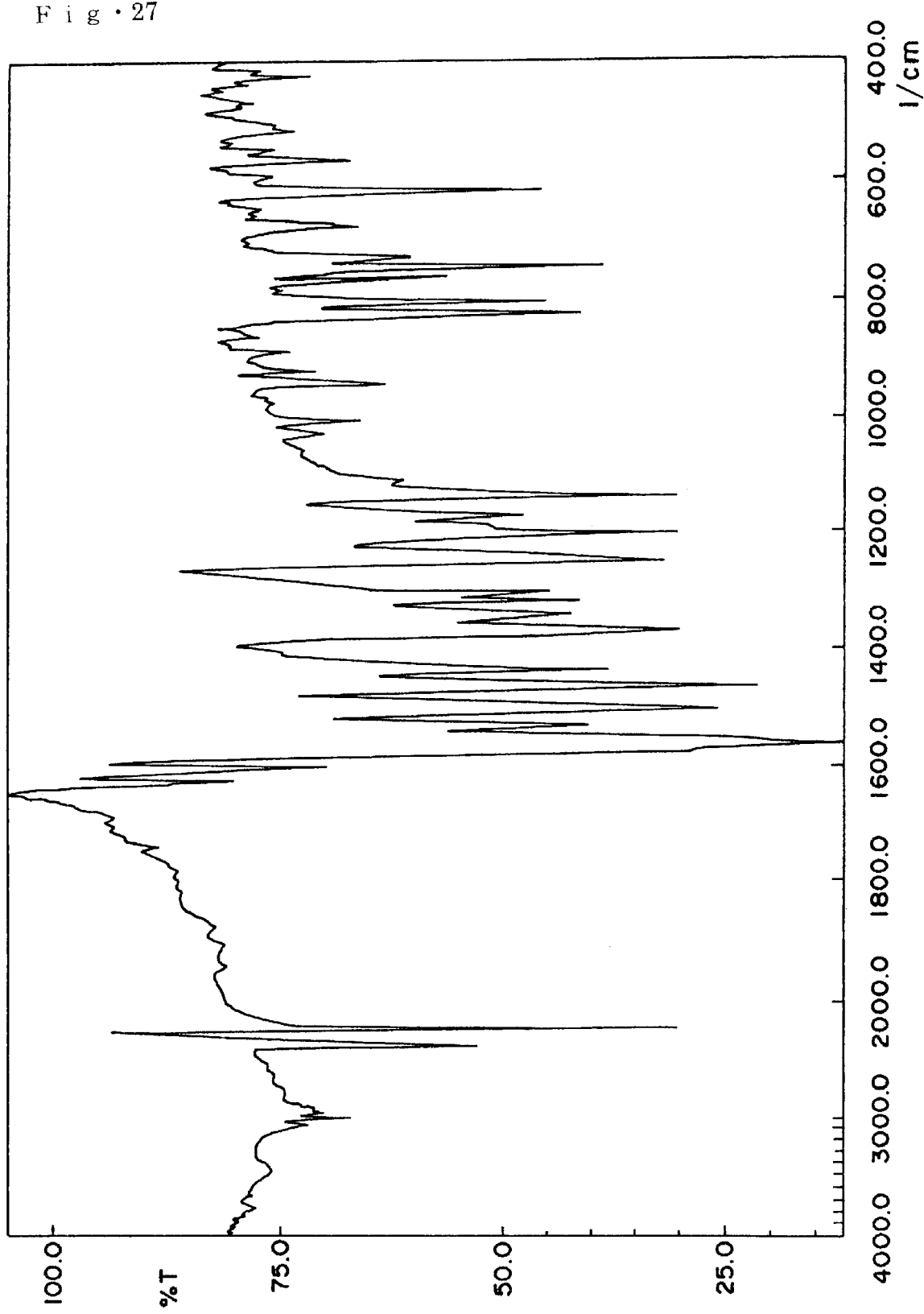
FIG. 27 is an IR chart of the yellow solid obtained in (4) of Example 12.

The yield of the synthesized compound was 87%, and its melting point was 238–240° C. The IR chart is shown in FIG. 27.

(5) Synthesis of N-(4'-ethyl-4-biphenyl)-3-(tricyanoethenyl)carbazole 0.20 g (0.47 mmol) of N-(4'-ethyl-4-biphenyl)-3-(dicyanovinyl)carbazole and 3.0 ml of N,N-dimethylformamide as solvent were placed in a 200 ml four-necked flask with a mechanical stirrer and bulb-shaped cooler. To this was added an aqueous solution prepared from 0.10 g (2.0 mmol) of sodium cyanide and 0.5 ml of water, which was stirred for 10 minutes. Further, 0.21 g (0.47 mmol) of lead tetraacetate was added. The resultant product was subjected to the reaction for 30 minutes. After the reaction was completed, 50 ml of chloroform was added. To the resultant solution was added 50 ml of water. The resultant liquid was washed in a separatory funnel. To the washed liquid was added sodium sulfate, which was left to stand for 30 minutes and dehydrated. The dehydrated solution was concentrated in an evaporator and dried under vacuum to obtain a red solid. The resultant solid was recrystallized in the presence of benzene to obtain 0.10 g of a red crystal.

Figure 28:
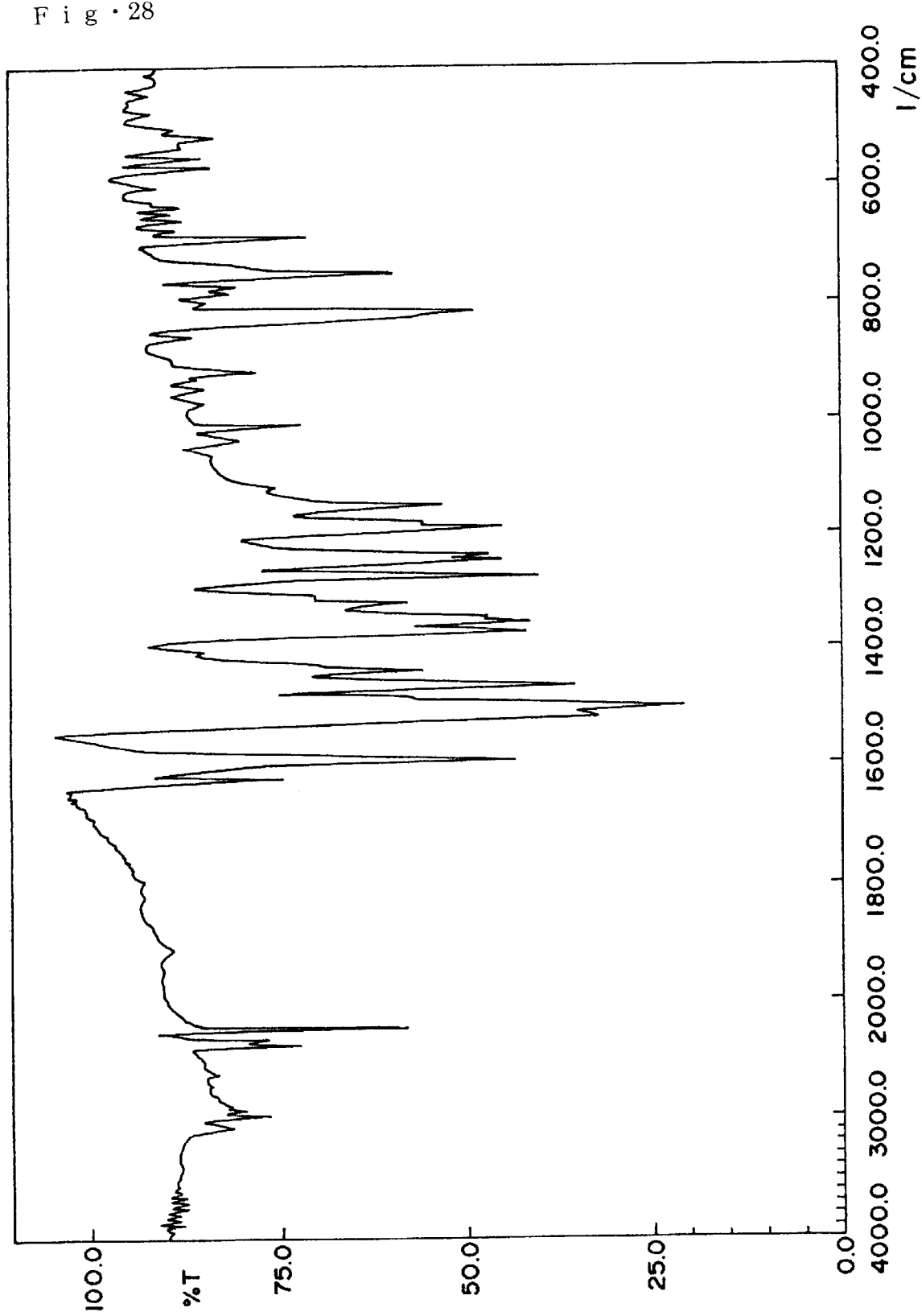
FIG. 28 is an IR chart of the red crystal obtained in (5) of Example 12.

The yield of the synthesized compound was 49%, and its melting point was 241–243° C. The IR chart is shown in FIG. 28.

The chemical analysis of this orange crystal was:

Actual measured vales: 83.22%C, 4.93%H, 12.23%N

Calculated value: 83.01%C, 4.49%H, 12.49%N

EXAMPLE 13

Synthesis of N-(p-tolyl)carbazole derivative (1) Synthesis of N-(p-tolyl)carbazole 32.0 g (191 mmol) of carbazole, 50.0 g (229 mmol) of 4-iodotoluene, 2.02 g (31.9 mmol) of copper powder, 16.8 g (53.7 mmol) of 18-crown-6-ether and 29.0 g (210 mmol) of potassium carbonate were placed in a 500 ml four-necked flask with a mechanical stirrer and bulb-shaped cooler. To this was added 300 ml of o-dichlorobenzene as solvent. The resultant product was heated to 180° C. under a nitrogen flow in a silicone oil bath, and subjected to the reaction for 113 hours. After the reaction was completed, the reaction product was subjected to suction filtration with a suction funnel, before it was cooled down. The resultant filtrate was concentrated in an evaporator. To the resultant oily product was added 200 ml of methanol. The precipitated solid was subjected to the filtration at a reduced pressure with a suction funnel to obtain a gray solid, which was recrystallized in the presence of benzene to obtain 31.0 g of a white crystal.

Figure 29:
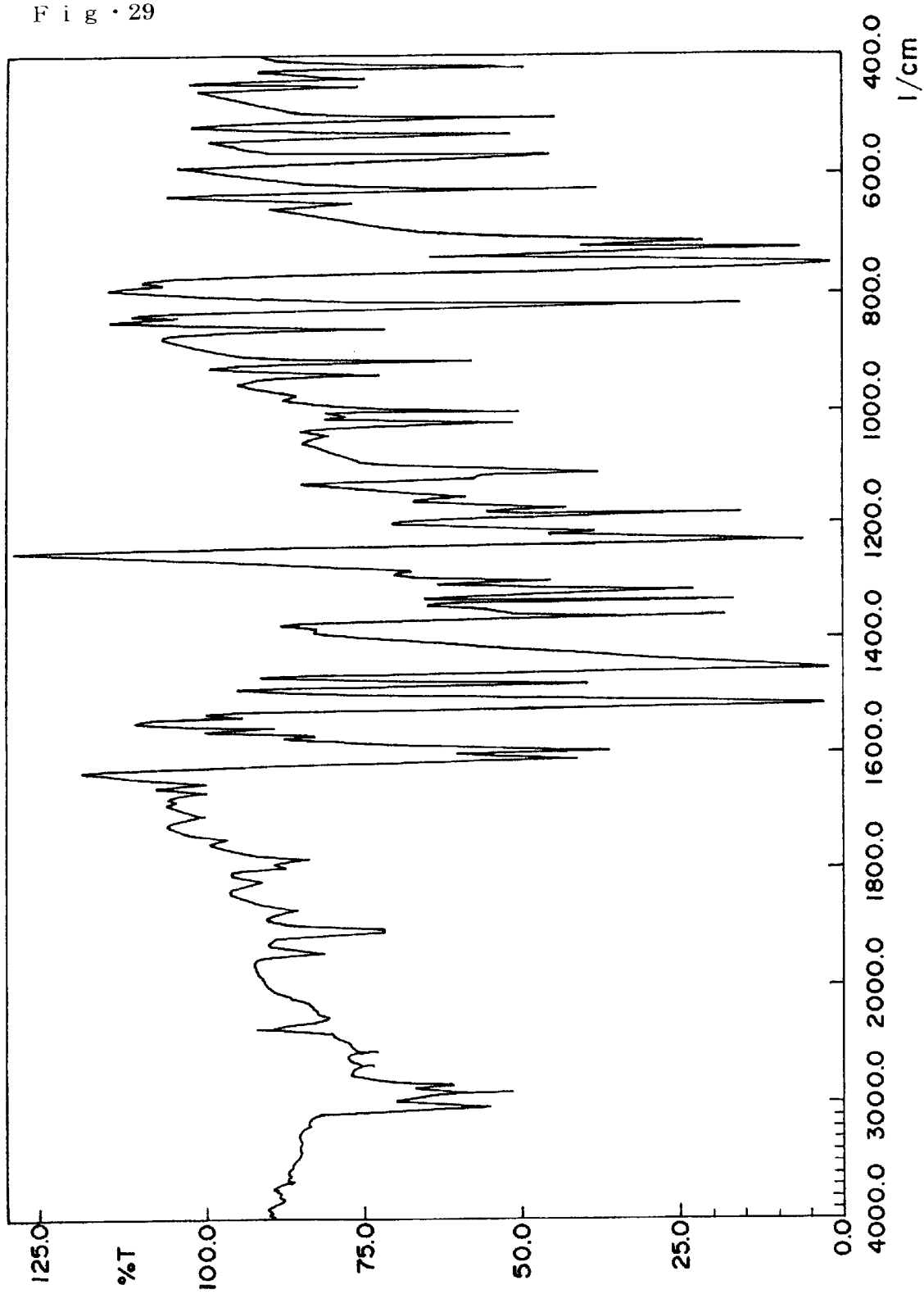
FIG. 29 is an IR chart of the white solid obtained in (1) of Example 13.

The yield of the thus synthesized compound was 70%, and its melting point was 104–106° C. The IR chart is shown in FIG. 29.

(2) Synthesis of N-(p-tolyl)carbazole-3-carboxaaldehyde 68.8 g (942 mmol) of N,N-dimethylformamide was placed in a 1000 ml four-necked flask with a mechanical stirrer and bulb-shaped cooler, which was cooled with ice water. To this was added 144 g (942 mmol) of phosphorus oxychloride, which was stirred for 30 minutes while cooled with ice. After returning to the ambient temperature, 20.00 g (85.7 mmol) of N-(p-tolyl)carbazole was added. The resultant product was heated to 85° C. in a silicone bath, and subjected to the reaction for 0.5 hour. After the reaction was completed, the product was cooled to the ambient temperature, and then cooled with ice. The liquid in the flask was placed in ice, and treated with sodium hydroxide to have a pH of 9 to 10. The liquid was subjected to extraction with chloroform. The resultant chloroform solution was washed with water three times. To the washed solution was added sodium sulfate, which was left to stand and dehydrated. The dehydrated solution was concentrated in an evaporator and dried under vacuum to obtain a brown solid. The resultant solid was recrystallized in the presence of acetone and methanol to obtain 14.0 g of a light brown crystal.

Figure 30:
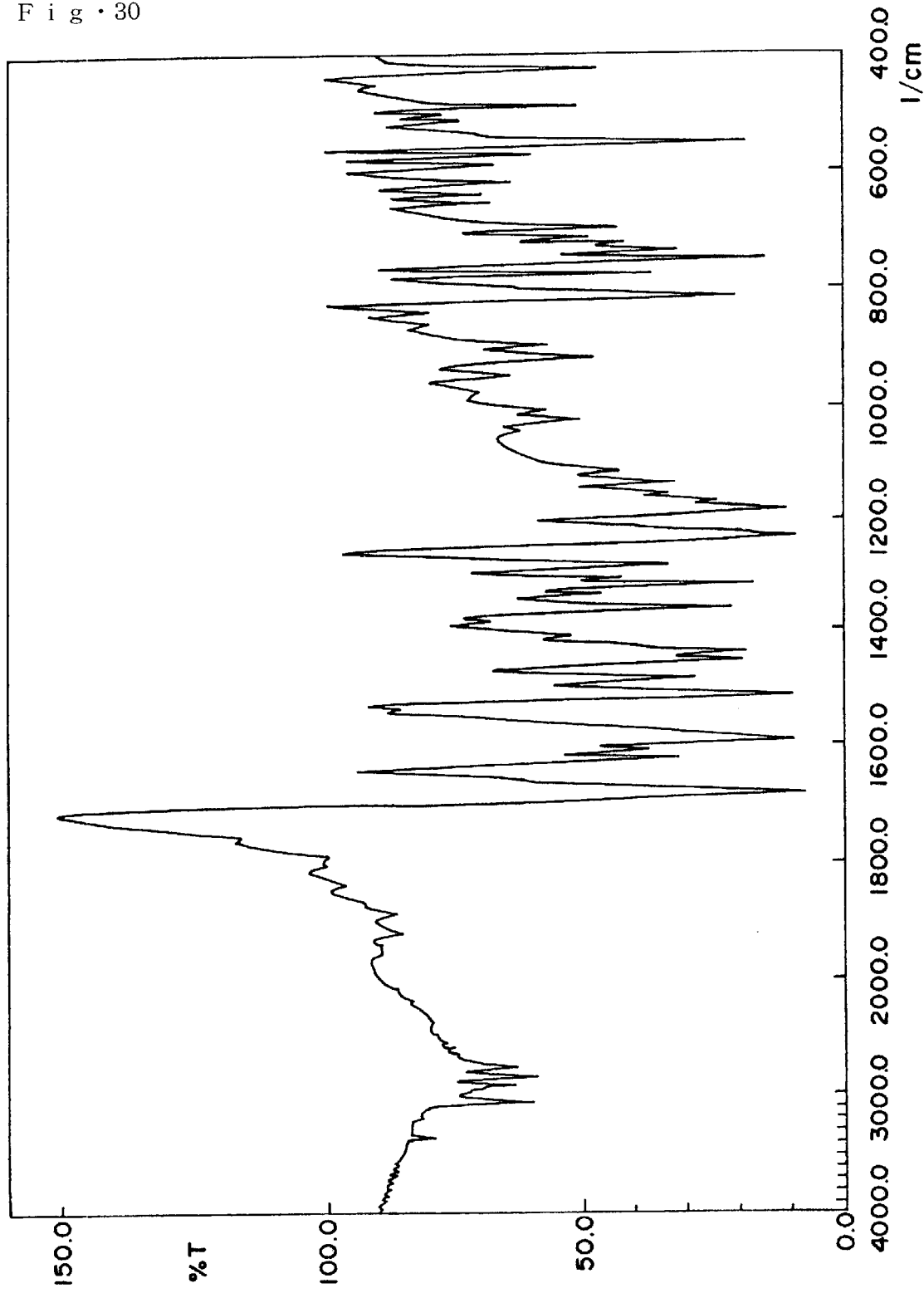
FIG. 30 is an IR chart of the light brown crystal obtained in (2) of Example 13.

The yield of the thus synthesized compound was 57%, and its melting point was 138–140° C. The IR chart is shown in FIG. 30.

(3) Synthesis of N-(p-tolyl)-3-(dicyanovinyl)carbazole 14.0 g (49.1 mmol) of N-(p-tolyl) carbazole-3-carboxaaldehyde and 3.57 g (54.0 mmol) of malononitrile were placed in a 1000 ml four-necked flask with a mechanical stirrer and bulb-shaped cooler. To this was added 200 ml of ethanol as solvent. Further, 4.59 g (54.0 mmol) of piperidine was added. The resultant product was heated to 60° C. in a silicone oil bath, and subjected to the reaction for 3 hours. After the reaction was completed, the product was cooled down to the ambient temperature. The reaction product was subjected to suction filtration with a glass filter. The resultant solid was washed with a small amount of ethanol to obtain 13.0 g of a yellow solid.

Figure 31:
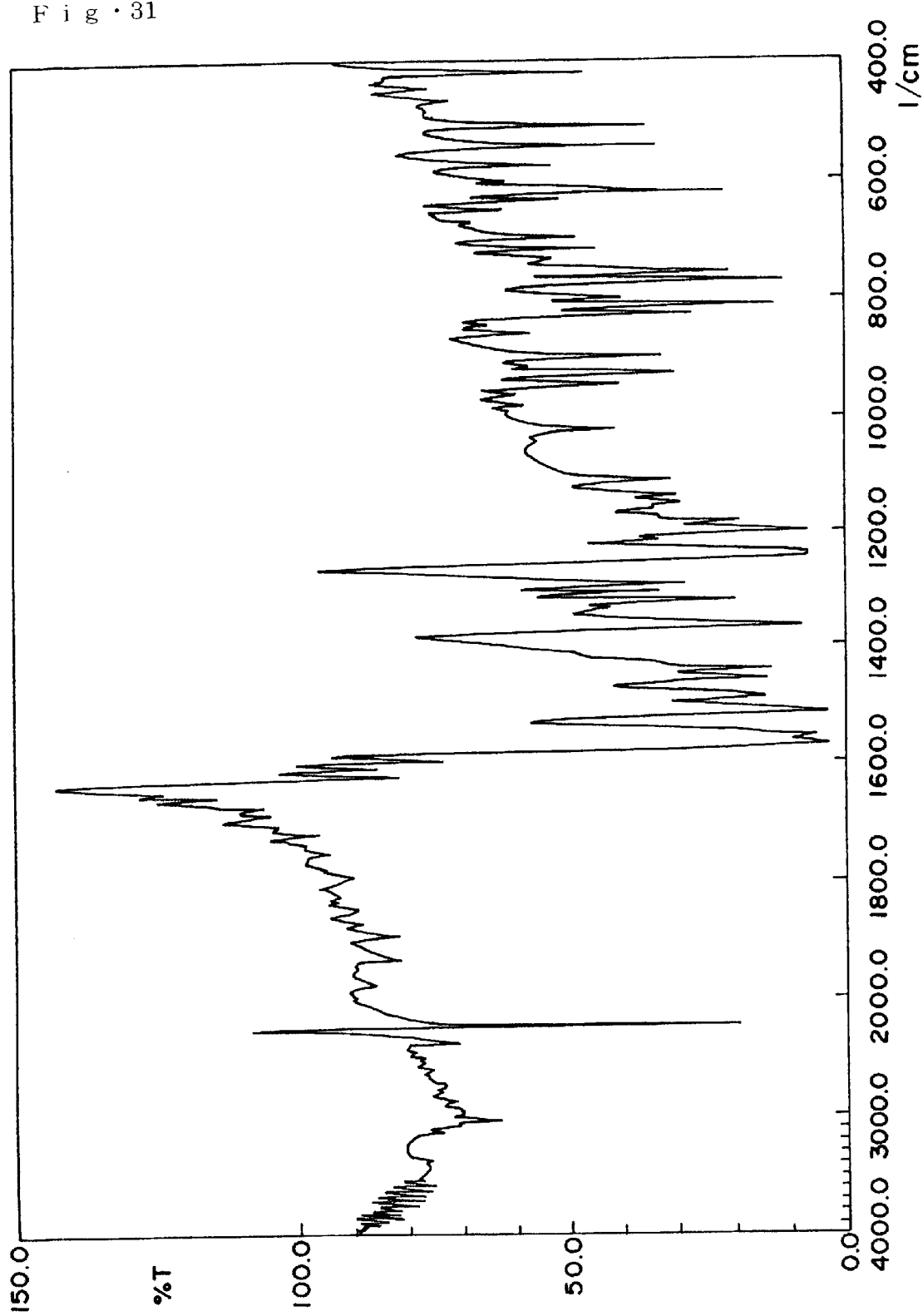
FIG. 31 is an IR chart of the yellow solid obtained in (2) of Example 13.

The yield of the thus synthesized compound was 79%, and its melting point was 213–215° C. The IR chart is shown in FIG. 31.

(4) Synthesis of N-(p-tolyl)-3-(tricyanoethenyl)carbazole 6.50 g (19.5 mmol) of N-(p-tolyl)-3-(dicyanovinyl)carbazole and 60 ml of N,N-dimethylformamide as solvent were placed in a 500 ml four-necked flask with a mechanical stirrer and bulb-shaped cooler. To this was added an aqueous solution prepared from 1.05 g (21.4 mmol) of sodium cyanide and 5.0 ml of water, which was stirred for 10 minutes. Further, 8.64 g (19.5 mmol) of lead tetraacetate was added. The resultant product was subjected to the reaction for 30 minutes. After the reaction was completed, 300 ml of chloroform was added. To the resultant solution was added 300 ml of water. The resultant liquid was washed in a separatory funnel. To the washed liquid was added sodium sulfate, which was left to stand for 30 minutes and dehydrated. The dehydrated solution was concentrated in an evaporator and dried under vacuum to obtain a red solid. The resultant solid was recrystallized in the presence of benzene to obtain 1.50 g of a red crystal.

Figure 32:
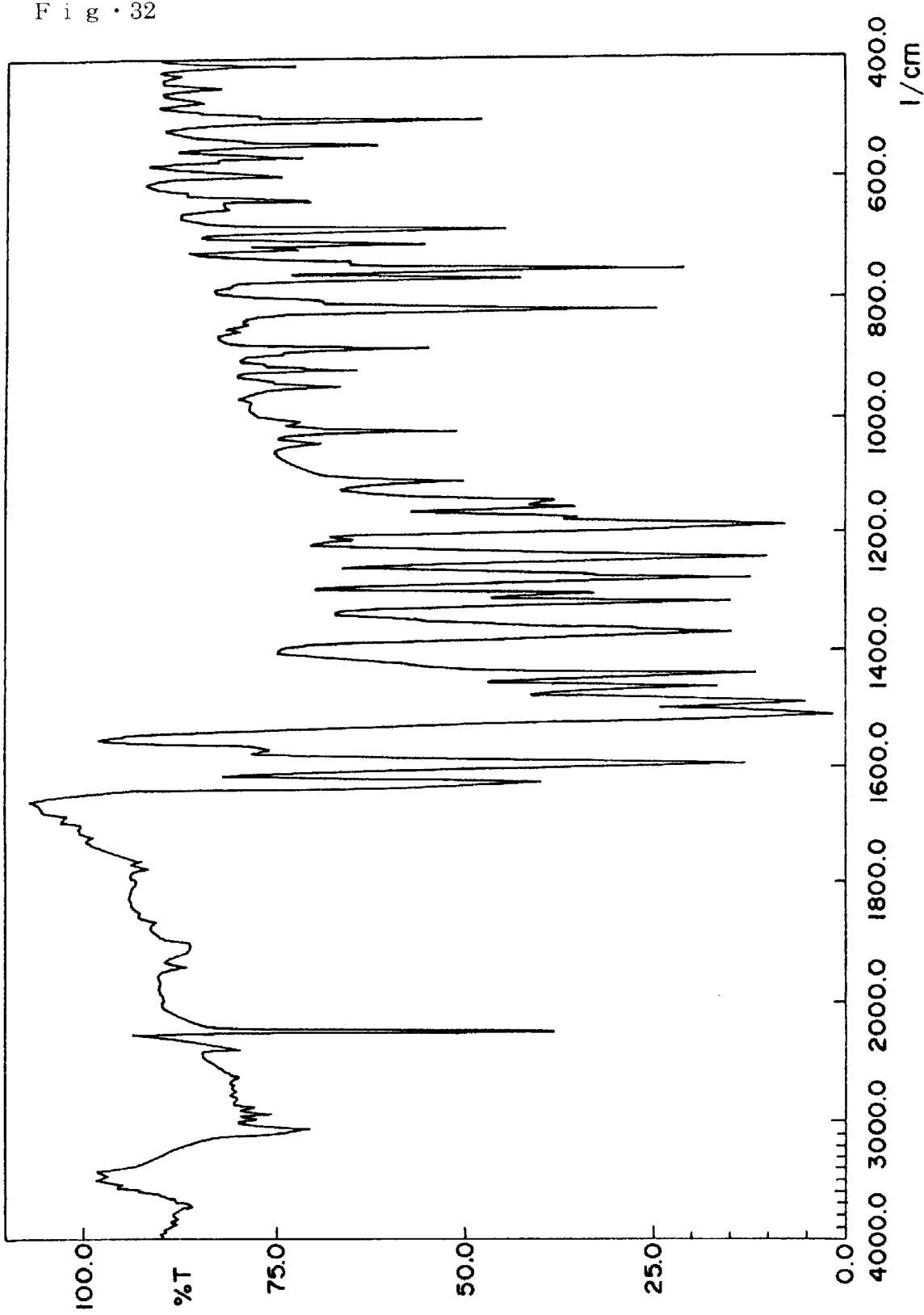
FIG. 32 is an IR chart of the red crystal obtained in (4) of Example 13.

The yield of the synthesized compound was 21%, and its melting point was 233–234° C. The IR chart is shown in FIG. 32.

The chemical analysis of this orange crystal was:
Actual measured vales: 80.31%C, 4.02%H, 15.56%N
Calculated value: 80.43%C, 3.94%H, 15.63%N

EXAMPLE 14

Synthesis of N-(p-methoxyphenyl)-3-(2-cyano-2-(2,3,4-trifluorophenyl)ethenyl)carbazole 1.76 g (5.84 mmol) of N-(p-methoxyphenyl)carbazole-3-carboxaaldehyde and 1.0 g (5.84 mmol) of 2,3,4-trifluorophenylacetonitrile were placed in a 200 ml four-necked flask with a mechanical stirrer and bulb-shaped cooler. To this was added 50 ml of ethanol as solvent. Further, 0.50 g (5.84 mmol) of piperidine was added. The resultant product was heated to 60° C. in a silicone oil bath, and subjected to the reaction for 2 hours. After the reaction was completed, the product was cooled down to the temperature of ice. The reaction product was subjected to suction filtration with a glass filter. The resultant solid was washed with a small amount of ethanol to obtain 0.4 g of a yellow solid.

Figure 33:
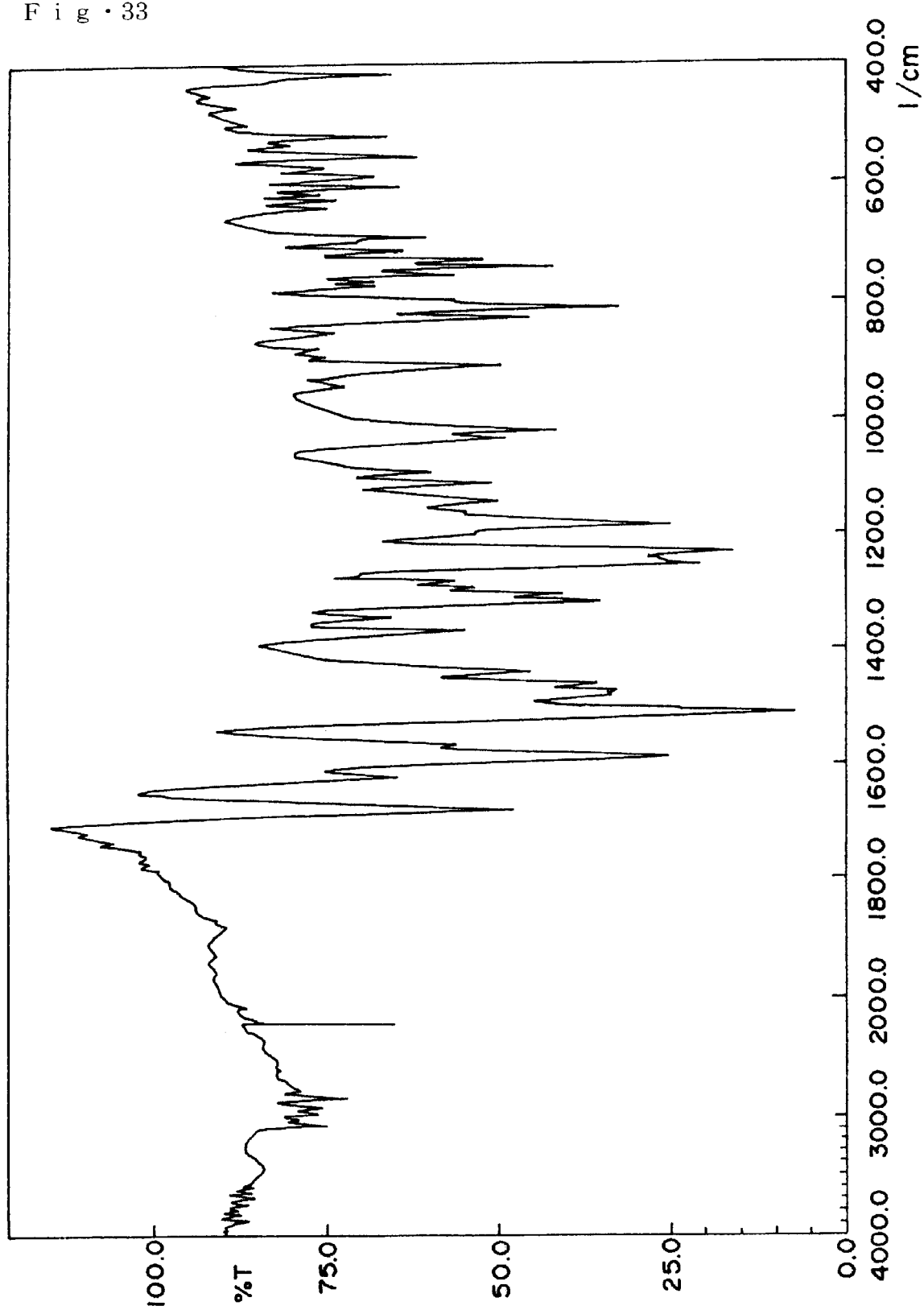
FIG. 33 is an IR chart of the yellow solid obtained in Example 14.

The yield of the thus synthesized compound was 15%, and its melting point was 124–126° C. The IR chart is shown in FIG. 33.

EXAMPLE 15

Synthesis of N-(p-tolyl)-3-(2-cyano-2-(2,3-difluoro-4-trifluoromethylphenyl)ethenyl)carbazole 0.65 g (2.26 mmol) of N-(p-tolyl)carbazole-3-carboxaaldehyde and 0.50 g (2.26 mmol) of 2,3-difluoro-4-trifluoromethylphenylacetonitrile were placed in a 200 ml four-necked flask with a mechanical stirrer and bulb-shaped cooler. To this was added 20 ml of ethanol as solvent. Further, 0.20 g (2.26 mmol) of piperidine was added. The resultant product was heated to 60° C. in a silicone oil bath, and subjected to the reaction for 3 hours. After the reaction was completed, the product was cooled down to the temperature of ice. The reaction product was subjected to suction filtration with a glass filter. The resultant solid was washed with a small amount of ethanol to obtain 0.4 g of a yellow solid.

Figure 34:
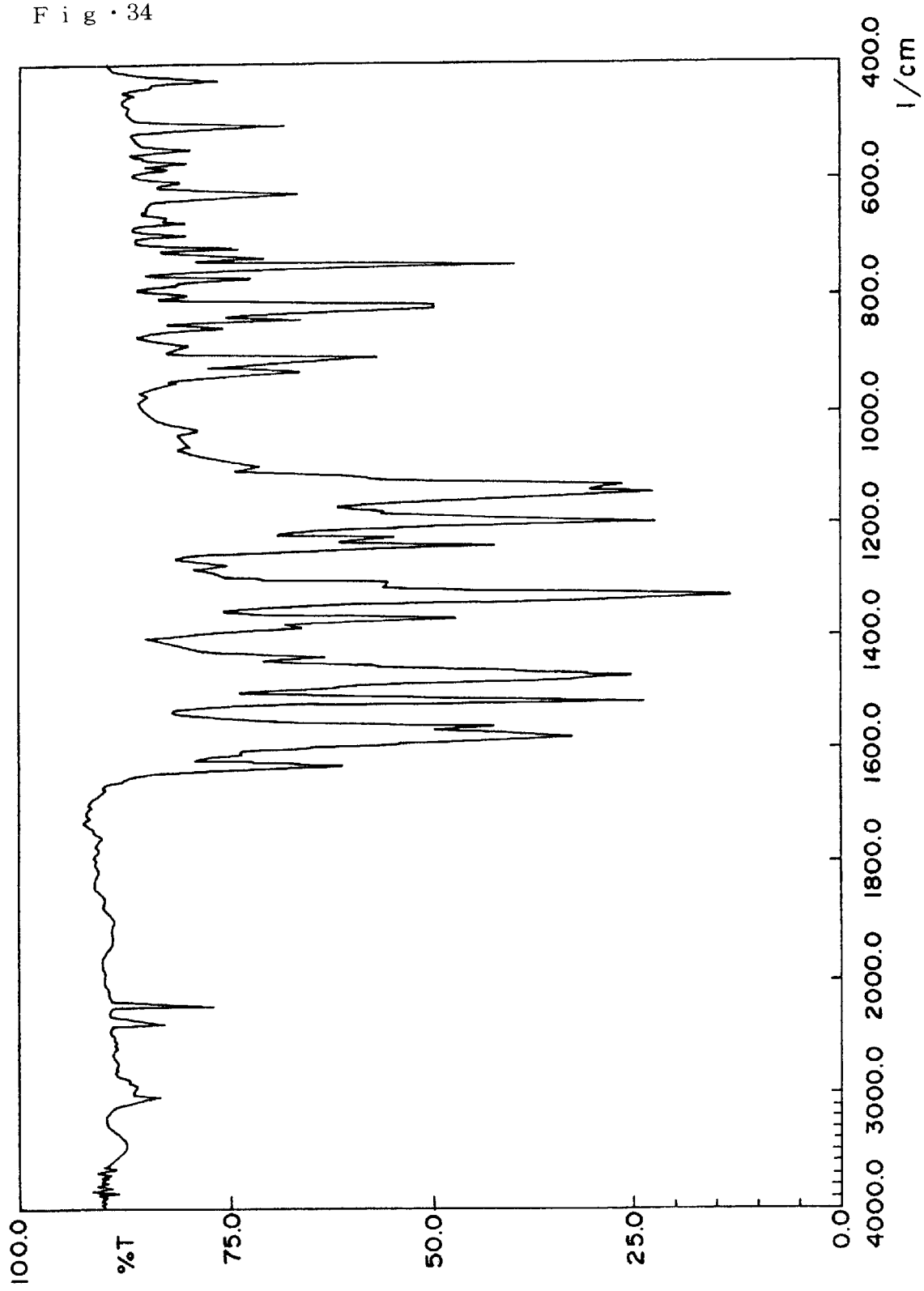
FIG. 34 is an IR chart of the yellow solid obtained in Example 15.

The yield of the thus synthesized compound was 36%, and its melting point was 137–139° C. The IR chart is shown in FIG. 34.

EXAMPLE 16

Synthesis of N-(4'-ethylbiphenyl)-3-(2-cyano-2-(3,5-bis(trifluoro)phenyl)ethenyl)carbazole 1.2 g (3.20 mmol) of N-(4'-ehtylbiphenyl)carbazole-3-carboxaaldehyde and 0.89 g (3.20 mmol) of 3,5-bis(trifluoromethyl)phenylacetonitrile were placed in a 200 ml four-necked flask with a mechanical stirrer and bulb-shaped cooler. To this was added 20 ml of ethanol as solvent. Further, 0.30 g (3.20 mmol) of piperidine was added. The resultant product was heated to 60° C. in a silicone oil bath, and subjected to the reaction for 2.5 hours. After the reaction was completed, the product was cooled down to the temperature of ice. The reaction product was subjected to suction filtration with a glass filter. The resultant solid was washed with a small amount of ethanol to obtain 0.47 g of a yellow solid.

Figure 35:
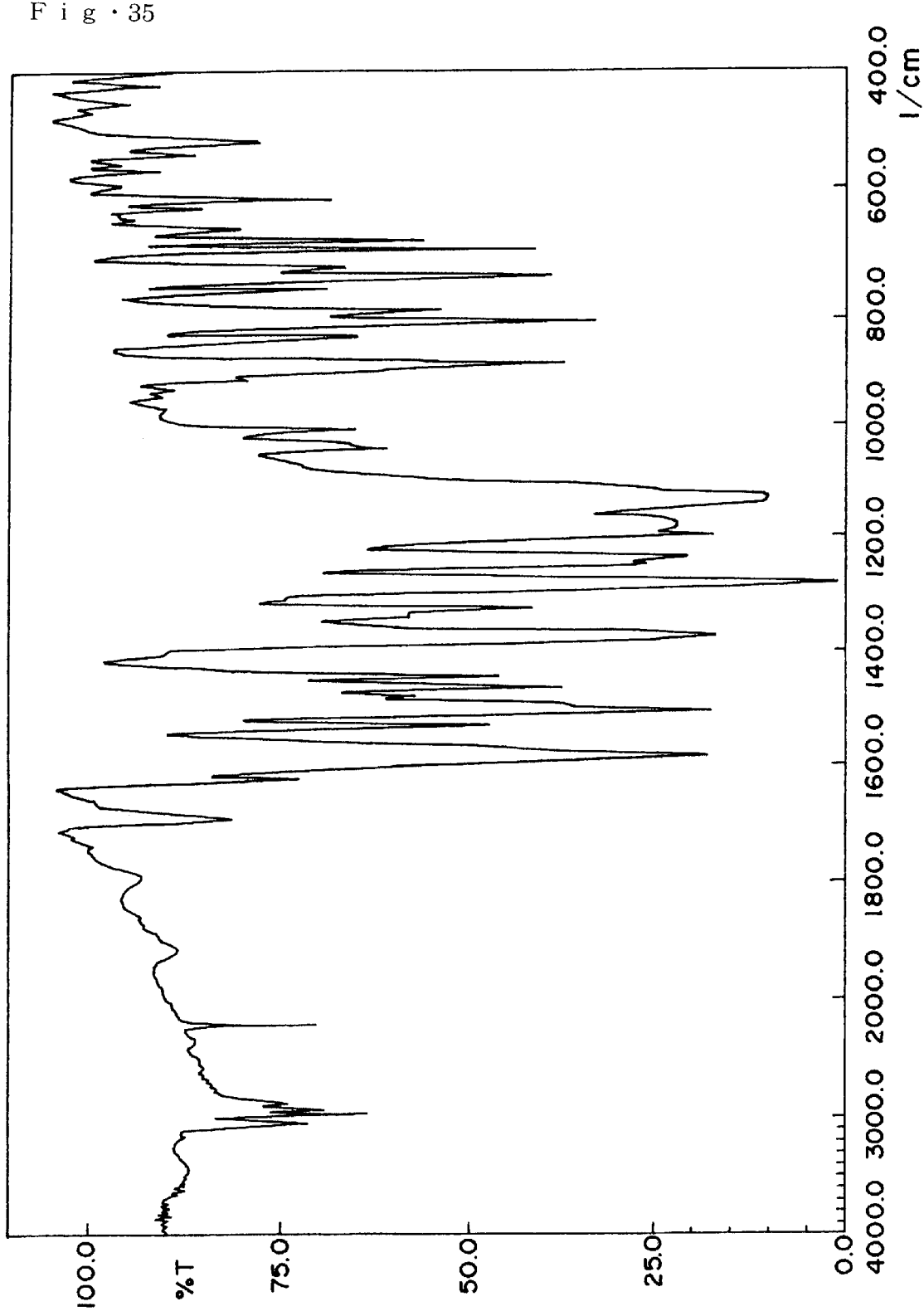
FIG. 35 is an IR chart of the yellow solid obtained in Example 16.

The yield of the thus synthesized compound was 25%, and its melting point was 154–156° C. The IR chart is shown in FIG. 35.

EXAMPLE 17

Synthesis of N-(p-tolyl)-3-(2-cyano-2-(3,5-trifluoromethyl)phenyl)ethenyl)carbazole 1.00 g (3.51 mmol) of N-(p-tolyl)carbazole-3-carboxaaldehyde and 0.89 g (3.51 mmol) of 3,5-bis(trifluoromethyl)phenylacetonitrile were placed in a 200 ml four-necked flask with a mechanical stirrer and bulb-shaped cooler. To this was added 30 ml of ethanol as solvent. Further, 0.30 g (3.51 mmol) of piperidine was added. The resultant product was heated to 60° C. in a silicone oil bath, and subjected to the reaction for 3 hours. After the reaction was completed, the product was cooled down to the temperature of ice. The reaction product was subjected to suction filtration with a glass filter. The resultant solid was washed with a small amount of ethanol to obtain 0.87 g of a yellow solid.

Figure 36:
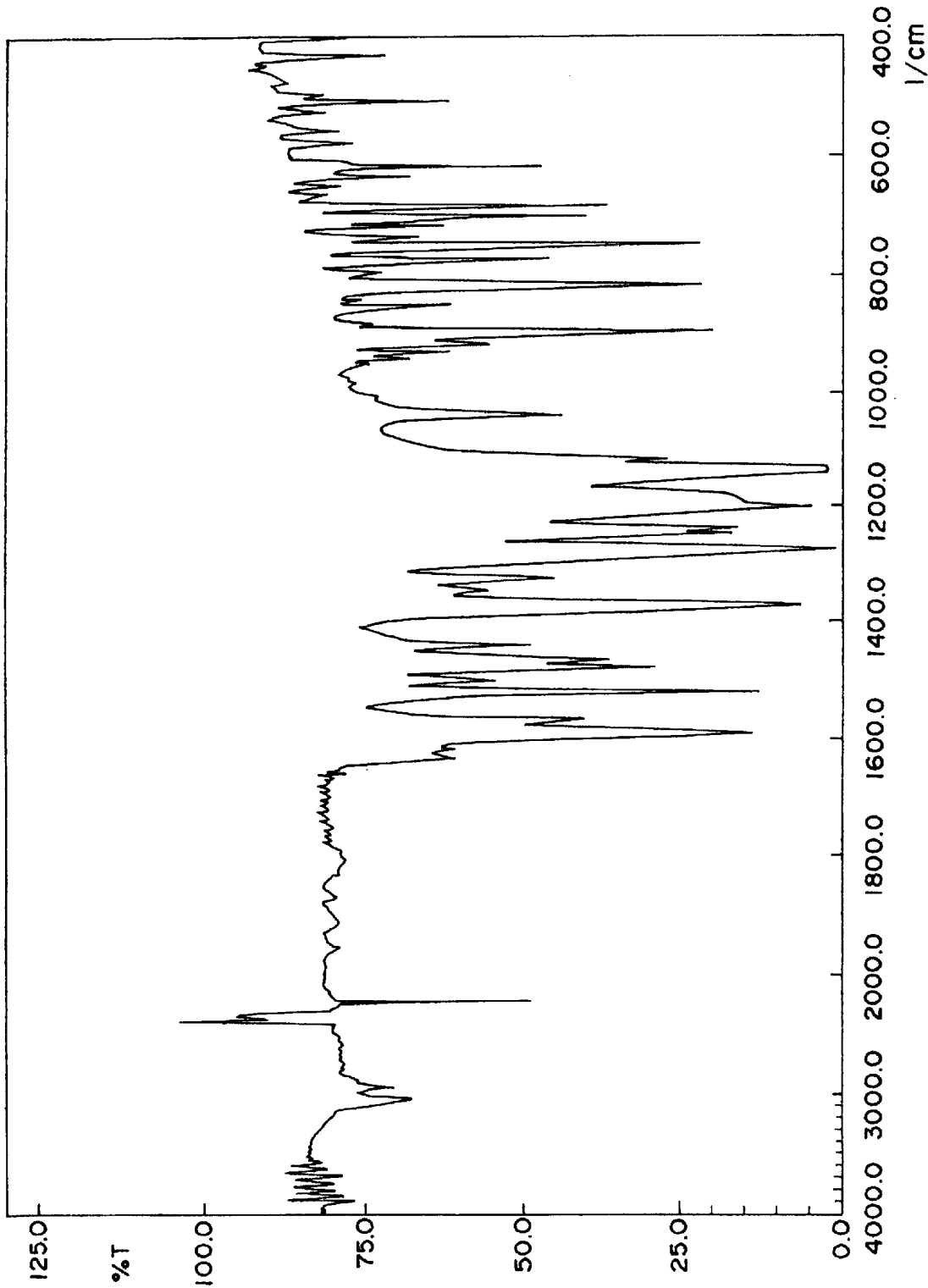
FIG. 36 is an IR chart of the yellow solid obtained in Example 17.

The yield of the thus synthesized compound was 48%, and its melting point was 234–235° C. The IR chart is shown in FIG. 36.

EXAMPLE 18

Synthesis of N-chloroethyl-3-(2-cyano-2-(3,5-bis(trifluoromethyl)phenyl)ethenyl)carbazole 1.00 g (3.51 mmol) of N-chloroethylcarbazole-3-carboxaaldehyde and 0.98 g (3.88 mmol) of 3,5-bis(trifluoromethyl)phenylacetonitrile were placed in a 200 ml four-necked flask with a mechanical stirrer and bulb-shaped cooler. To this was added 30 ml of ethanol as solvent. Further, 0.33 g (3.88 mmol of piperidine was added. The resultant product was heated to 60° C. in a silicone oil bath, and subjected to the reaction for 3 hours. After the reaction was completed, the product was cooled down to the temperature of ice. The reaction product was subjected to suction filtration with a glass filter. The resultant solid was washed with a small amount of ethanol to obtain 1.30 g of a yellow solid.

Figure 37:
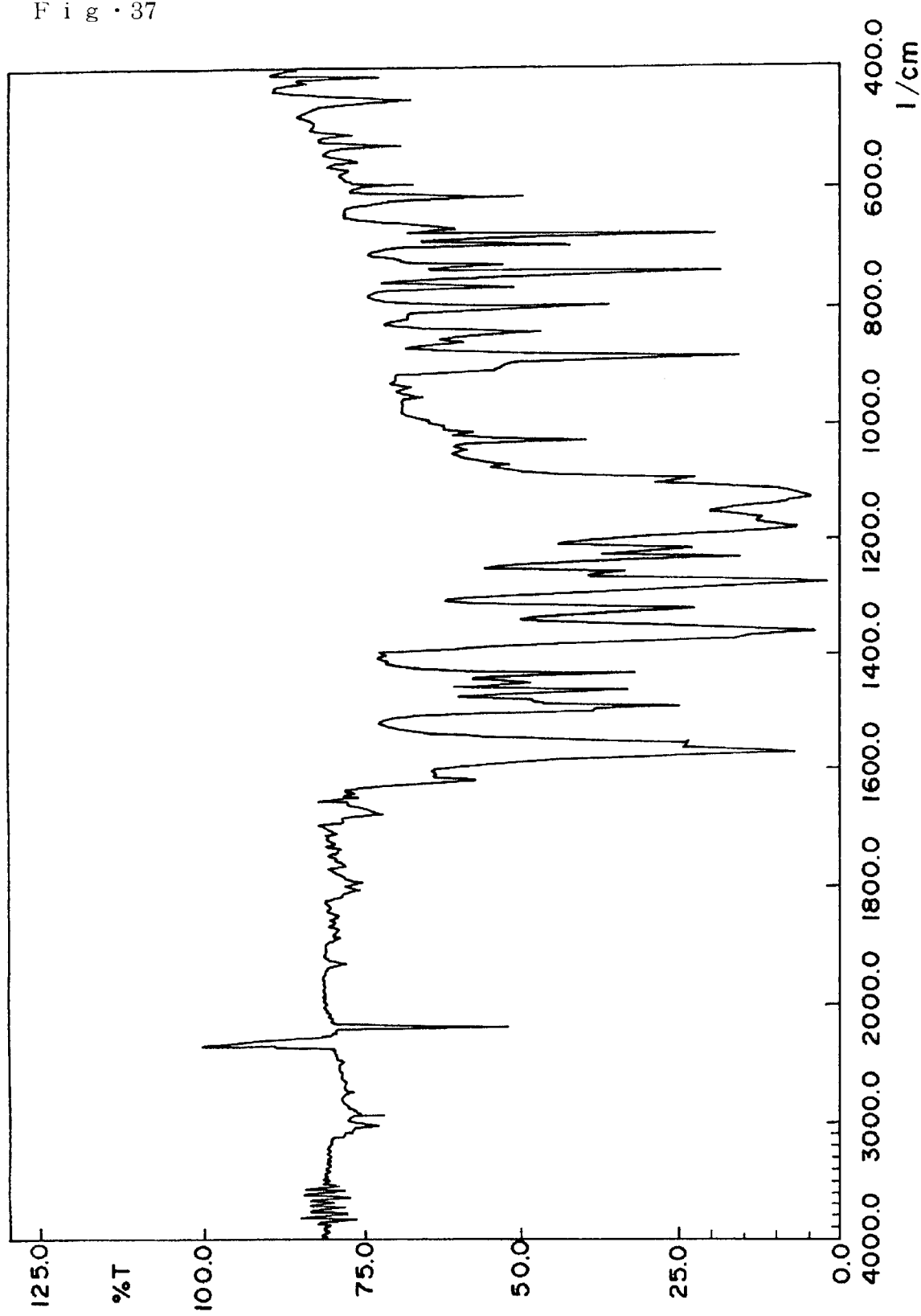
FIG. 37 is an IR chart of the yellow solid obtained in Example 18.

The yield of the thus synthesized compound was 68%, and its melting point was 214–215° C. The IR chart is shown in FIG. 37.

Industrial Utility

According to this invention, an illuminant with a high efficiency of light emission and high purity can be provided at low cost.

Changing the kinds of electron-donating group A and electron-attracting group B allows the carbazole derivative luminescent compound of this invention to emit various color lights of red to blue.

The introduction of an aryl group having electron-attracting group B into the electron-attracting group makes the carbazole derivative luminescent compound of this invention more stable in the structure thereof, better in thermal stability, less subject to degradation, and improved in chemical resistance.

What is claimed is:

1. A luminescent compound having formula 1:

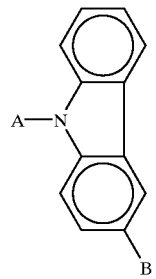

formula 1 wherein A is an electron-donating group, and B is an electron-attracting group having formula 3:

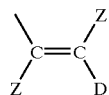

formula 3 wherein each Z is hydrogen atom or cyano group, with the proviso that at least one Z is cyano group, and D is an aryl group having at least one electron-attracting group, or an ester group.

2. The luminescent compound according to claim 1, wherein the electron-donating group is an alkyl, haloalkyl, aminoaryl, alkylaminoaryl, or alkoxyaryl group, each of said alkyl group, haloalkyl group, and alkoxy group of the alkoxyaryl group has a carbon number of 1 to 20, said alkylaminoaryl group includes a monoalkylaminoaryl group and dialkylaminoaryl group, the alkyl group of said alkylaminoaryl group has a carbon number of 1 to 20.

3. The luminescent compound according to claim 1, wherein said D is an aryl group having at least one fluorine-containing electron-attracting group.

* * * * *